United States Patent [19]

Miyamoto et al.

[11] Patent Number: 5,818,202
[45] Date of Patent: Oct. 6, 1998

[54] CHARGING APPARATUS AND CHARGING SYSTEM

[75] Inventors: Isamu Miyamoto, Tokyo, Japan; Neil Simmonds, Columbia, Canada

[73] Assignee: Zip Charge Corporation, Tokyo, Japan

[21] Appl. No.: 793,467

[22] PCT Filed: Jun. 17, 1996

[86] PCT No.: PCT/JP96/01655

§ 371 Date: Mar. 28, 1997

§ 102(e) Date: Mar. 28, 1997

[87] PCT Pub. No.: WO97/00540

PCT Pub. Date: Jan. 3, 1997

[30] Foreign Application Priority Data

Jun. 16, 1995 [JP] Japan ................................. 7-183173

[51] Int. Cl.⁶ .................................................. H01M 10/46
[52] U.S. Cl. .......................... 320/125; 320/133; 320/160
[58] Field of Search .................................. 230/20, 21, 22, 230/23, 24, 30, 31, 32, 39, 40, 125, 120, 138, 141, 145, 152, 155, 159, 160, 162, 133

[56] References Cited

U.S. PATENT DOCUMENTS

| | | | |
|---|---|---|---|
| 4,146,830 | 3/1979 | Foster | 320/160 |
| 5,140,252 | 8/1992 | Kizu et al. | 320/20 |
| 5,233,284 | 8/1993 | Mattsson | 320/32 X |
| 5,329,219 | 7/1994 | Garrett | 320/160 X |
| 5,408,170 | 4/1995 | Umetsu et al. | 320/39 |
| 5,550,453 | 8/1996 | Bohne et al. | 320/160 X |

*Primary Examiner*—Edward Tso
*Attorney, Agent, or Firm*—Greer, Burns & Crain, Ltd.

[57] ABSTRACT

A high-speed secondary cell charging system is provided which accurately measures the amount of time to achieve a full-charge condition in a secondary cell. In this system, when charging a secondary cell while detecting a charging characteristic of the secondary cell, charging is performed of the secondary cell using a prescribed amount of charging current. Then, when a prescribed condition with regard to the secondary cell is detected, the secondary cell is charged once again, this time with a current that is smaller than the previous charging current. When a condition indicating the completion of the charging of the secondary cell is detected, the charging is stopped. If this condition is not detected, a yet smaller charging current is set and the charging of the secondary cell is performed once again, the above operations being repeated until a condition which indicates that the charging of the secondary cell is complete is detected.

20 Claims, 32 Drawing Sheets

Fig. 9
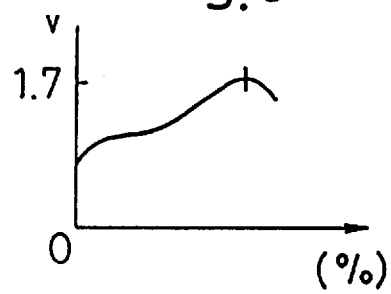
FIG.9(A)
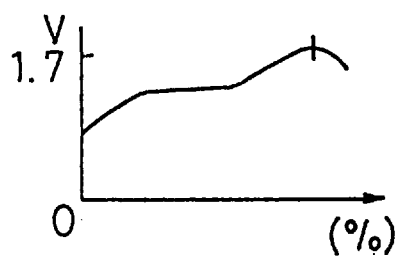
FIG.9 (B)
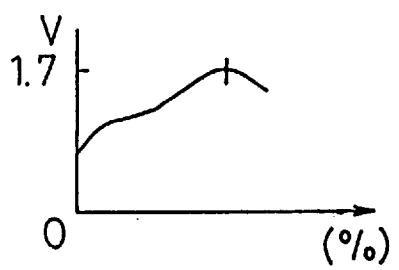
FIG.9 (C)
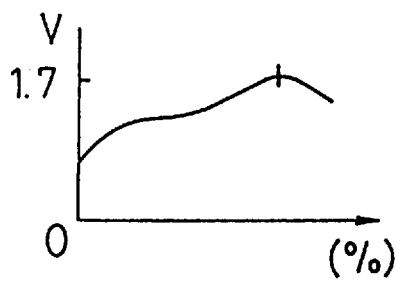
FIG.9 (D)
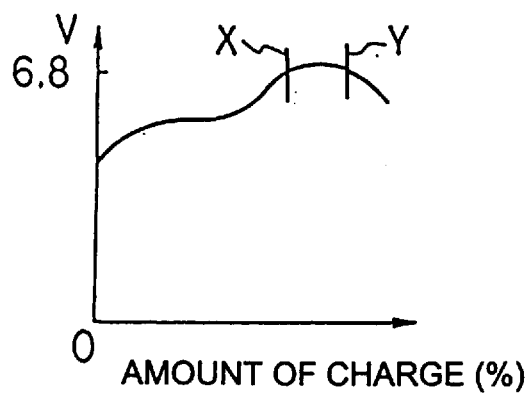
FIG.9 (E)
AMOUNT OF CHARGE (%)

Fig.14 (LITHIUM ION 3.6 V/750 mAH BATTERY USED)

(LITHIUM ION 3.6 V/750 mAH BATTERY USED)

| AMOUNT OF CHARGE | Measured Voltage |
|---|---|
| 10% | 1.375V |
| 20 | 1.402 |
| 30 | 1.617 |
| 40 | 1.427 |
| 50 | 1.432 |
| 60 | 1.436 |
| 70 | 1.446 |
| 80 | 1.463 |
| 90 | 1.483 |

# CHARGING APPARATUS AND CHARGING SYSTEM

FIELD OF UTILIZATION IN INDUSTRY

The present invention relates to a charging system for a secondary cell and to a secondary cell charging apparatus, and more specifically to a charging system and secondary cell charging apparatus which, in charging a secondary cell, are capable of causing a secondary cell to achieve a charged state that is close to a full charge, and also of causing the secondary cell to operate with good efficiency at all times, so that a long life is maintained for the secondary cell.

DESCRIPTION OF THE BACKGROUND ART

In general, secondary cells such as lead batteries, nickel-cadmium batteries, nickel-hydrogen batteries, nickel-zinc batteries, and lithium ion batteries are recharged many times over their useful lifetime.

When recharging a secondary cell for the first time, the recharging process requires as much as several hours. That is, in the prior art process of recharging the above-noted secondary cells, 6 hours, or in extreme cases even 16 hours, were required to perform the charging operation, and even with what was called a quick charge a, 1 to 2 hour time period was required.

In the past, when recharging a rechargeable battery of this type known as a secondary cell for the intended purpose, although the desire to shorten the charging time as much as possible was known, because of internal temperature and pressure increases within the secondary cell, caused by the principles of chemical reaction occurring within the cell, a limit was reached, and because the drive of a large current through the battery over a short period of time led not only to damage to the battery but to a deterioration of the characteristics, that is, the output characteristics, of the battery, this approach was not taken.

However, in recent years, the demand for such secondary cells has increased in a large number of industrial fields, and there is an increasing demand for a secondary cell that can be charged quickly, and preferably even instantaneously, particularly in the case of such applications in which a loss of battery power is highly undesirable, such as in machine tool applications, medical equipment for hospitals and the like, and mobile telephone applications.

Therefore, with an increase in consumer equipment which is powered by secondary cells, there has arisen a desire for a secondary battery that can be recharged in units of minutes rather then units of hours.

In the process of charging a secondary cell, to prevent irreversible damage to the battery, it is necessary to provide more careful monitoring and control, and while a variety of secondary cell recharging systems which quickly recharge a secondary cell have been developed to date, none of them provides satisfactory results.

For example, in Japanese Examined Patent Publication (KOKOKU) No. 62-23528 and Japanese Examined Patent Publication (KOKOKU )No. 62-23529, a method of recharging secondary batteries such as nickel-cadmium batteries is disclosed, wherein the variation in the voltage waveform is observed during the recharging operation where a plurality of inflection points which appear in this voltage waveform have been stored beforehand, and when these stored plurality of inflection points appear in a prescribed sequence, the recharging operation is interrupted.

In this method, however, it is necessary to store beforehand for each type of battery the changing in the voltage waveform occurring during a charging operation, and to overwrite the stored contents before performing the charging operation a correspondence, with the above-noted stored information corresponding to the type of battery to be recharge.

In addition to this making operating complex, depending upon the environment in which the charging is performed and the history, for example, of the battery, the voltage output waveform will not necessarily match in sequence and magnitude of the stored information, so that it is not possible to perform a precise charging and recharging operation, thus making it difficult to perform a high-speed charging operation without causing deterioration of the battery's performance.

In the recharging of a secondary cell as described above in the past, from 6 to as much as 16 hours was required for charging, and even with what was called a quick charge a, 1 to 2 hour time period was required.

In the past, when recharging a rechargeable battery of this type known as a secondary cell for the intended purpose, although the desire to shorten the charging time as much as possible was known, because of internal temperature and pressure increase within the secondary cell, caused by the principles of chemical reaction occurring within the cell, a limit was reached, and because the drive of a large current through the battery over a short period of time led not only to damage to the battery but to a deterioration of the characteristics, that is, the output characteristics, of the battery, this approach was not taken.

However, in recent years, the demand for such secondary cells has increased in a large number of industrial fields, and there is an increasing demand for a secondary cell that can be charged quickly, and preferably even instantaneously, particular in the case of such applications in which a loss of battery power is highly undesirable, such as in machine tool applications, medical equipment for hospitals and the like, and mobile telephone applications.

In the above-noted charging operations of secondary cells, a new problem has arisen.

Specifically, particularly in the case of quick charging, the output characteristics, for example, the output voltage characteristics curve of a secondary cell being charged, as shown in FIG. 6, exhibits a characteristic phenomenon. More specifically, in the charging condition of a secondary cell before it substantially reaches a full charge, a protrusion (pre-peak) occurs in the output voltage characteristics curve, so that in such methods as the prior art negative delta V method, in which when a peak is detected in the output voltage of the secondary cell was detected, this being taken to be the full charge condition of the secondary cell, at which point the charging is stopped, or in which the rate of rise of the output voltage from the secondary cell is detected, the charging operation being stopped when this rate of rise decreased or reached 0, this being taken as the full-charge condition of the secondary cell, at the above-noted pre-peak, the charging is stopped, so that it becomes impossible to achieve a fully charged condition in the secondary cell.

The reason for the above behavior, as shown in FIG. 7, is that in the case of a quick charge, the basic problem of a peak occurring in the battery voltage when the charging is done with a current that is smaller than the required amount of current, the degree of this effect being considerably sensitive to, for example, the conditions under which the secondary cell is manufactured.

Therefore, if a charging operation is performed under these conditions, the apparent capacity of the secondary cell is reduced, which causes a great problem in actual use.

One method that has been proposed in the past for solving this problem is that of performing an additional charging for a given period of time with a small current. This method does not enable the achievement of a quick charge, and also is accompanied by the risk of overcharging the secondary cell, thereby causing a deterioration of the secondary cell.

From the standpoint of practical use, during the charging operation, there are many cases in which the charging is purposely stopped without waiting for the achievement of the full-charge condition, after which the battery is used, that is, discharged. With some types of secondary cell, if this kind of use is repeated, a bump-like protrusion (pre-peak) as described above will occur in the output voltage characteristics curve at approximately 80% of a full charge (charge ratio), this pre-peak becoming larger as the above-noted charging method is repeated, so that in previous methods of charging, such as described above, the charging operation is stopped at the above-noted pre-peak, which causes a problem in the form of a decrease in battery capacity.

In addition, once a pre-peak occurs, in subsequent charging operations as well, because the charging operation stops at this pre-peak, the troublesome problem known as the memory effect occurs.

While the cause of the occurrence of this pre-peak is still unknown, because of the generation of gas within the battery in the region of 70% to 80% of full charge, it is suspected that the cause lies with the gas consumption rate in the battery and the materials that are used in making the battery.

When charging a type of secondary cell which has been stored for a long period of time immediately after being manufactured and which is therefore said to not have been activated, there are cases in which the exhibited charging characteristics are quite different from the expected characteristics.

For example, there are cases in which, because there is no peak occurring in the output voltage characteristics of the secondary cell during charging, either the charging operation stops, or is incapable of being stopped, resulting in overcharging, thereby causing damage to the secondary cell, and cases in which a peak occurs in the output voltage characteristics curve far earlier than the prescribed charging time, thereby causing premature stoppage of the charging operation.

Yet another problem is that of the case in which the secondary cell is not a single secondary cell, but rather a secondary cell which is formed from the series connection of a plurality of cells, in which case, in the same manner as described above, as shown in FIG. 8, a peak P' can occur. This resembles the true peak, and occurs previous to the occurrence of the true peak value which occurs at the full-charge point in the charging characteristics of this type of pack secondary cell.

This peak is known as the pseudo-peak P'. The reason for the occurrence of this pseudo-peak P' is thought to be that the output voltage characteristics of the plurality of secondary cells making up the pack are not all uniform, but rather that there are slight differences between the residual capacity or capacity of the cells.

Furthermore, because the pseudo-peak becomes larger each time this type of charging and discharging is repeated thereafter, it presents a great problem in controlling the charging operation by means of peak detection or voltage rate of rise detection.

While the detailed cause of these problems has not been determined, if for example, as shown in FIG. 9, four secondary cells (A, B, C, D) are connected in series to form a single pack, and each of the voltage output characteristics curves thereof are as shown in FIGS. 9A through 9D, the output voltage characteristics curve of the overall secondary cell constituted by this grouping of individual secondary cells has a peak part P as shown in, for example, FIG. 9E, which represents the synthesis of the output voltage characteristics curves of the individual secondary cells as shown in FIGS. 9A through 9D.

When a secondary cell having an output voltage characteristics curve with such a pseudo-peak is charged, the charging is stopped at the pseudo-peak before reaching the true peak, which presents the problem that it is not possible to charge the pack-type secondary cell to the capacity that it should have.

That is, when the cell-to-cell variation in residual capacity of the individual cells is above a certain amount, it is known that a pseudo-peak occurs.

Among the causes that can be envisioned for differences between the residual capacity of the individual cells are, for example, (a) the case in which individual cells having mutually differing self-discharge characteristics were stored after being grouped in a pack-type cell, (b) the case in which the charging of cells grouped in a pack and having mutually differing charge ratios is stopped before reaching full charge, after which they are discharged, this being repeated, the effect being particularly prominent when the charging rate is high, (c) the case in which discharging is one at a high current level, (d) the case in which some of the cells are deep-discharged to the extent of polarity reversal, and (e) the case in which the lives of the cells are different, and the cells include a cell having a capacity that has decreased to some degree.

In addition, when a secondary cell is quickly discharged under these conditions, part of the cells are deep-discharged, resulting in a shortening of the lives of those cells.

When charging is done of a secondary cell formed from a plurality of cells and having an output voltage characteristics curve as shown in FIG. 9E, if charging of the secondary cell is performed by the method of detection the variation in the output voltage of this secondary cell to detect the condition in which the secondary cell is at full charge, because the charging operation stops at point X shown in FIG. 9E, at which it is judged that full charge has been reached, while there is no problem with regard to cell C, with regard to the remaining cells, A, B, and D, full charge is not reached, so that it is not possible to maintain the required capacity of the overall secondary cell.

In addition, if rapid discharge is done, there is a danger of deep-discharging cells A, B, and D.

When charging a secondary cell formed from a plurality of cells and having an output voltage characteristics curve such as shown in FIG. 9E, if the so-called negative delta V method (in which the full-charge condition is detected at the point at which the output voltage of the secondary cell drops a given amount from the peak value) is employed in performing the charging operation, when the apparent full-charge condition is reached at point Y in FIG. 9E, because the charging operation is stopped, while there is no problem with regard to cell B, the remaining cells, A, C, and D are overcharged, thus causing great damage to cells A, C, and D, the life of these cells being shortened from the normally expected life.

Furthermore, in spite of the fact that the cells other than the one which originally caused this problem have not yet reached the end of their life, the life of the battery pack as a whole is shortened.

In addition, in performing a charging operation on a secondary cell having such characteristics, if the charging operation is stopped at the above-noted pseudo-peak, in subsequent charging operations as well a similar pseudo-peak will cause the stoppage of the charging operation, so that it will not be possible to maintain the charge capacity that the secondary cell should normally have, thus making it impossible to use the secondary cell effectively.

FIG. 10 shows the output voltage characteristics curve of a secondary cell formed from a plurality of cells having a different constitution from FIG. 8, from which it can be seen that a pseudo-peak P' different from FIG. 8 occurs.

FIG. 11 shows the example of 2 C discharging of a secondary cell having this type of output voltage characteristics curve, and it can be seen that the discharge time for a secondary cell having the characteristics shown in FIG. 10 is considerably shorter than the required discharge time. Therefore, it can be seen that it is not possible to get the required energy from this secondary cell.

As a method of solving this problem, in the past, in the case in which a plurality of secondary cells were grouped in a pack, while it was natural to group cells having the same nominal capacities, even among cells having the same nominal capacity, if there are differences in manufacturing processes, manufacturer, manufacturing conditions, and time of manufacture, the output voltage characteristics curves such as described above will differ, so that when selection is done, each individual output voltage characteristics curve needed to be measured, with cells having the same or nearly the same output voltage characteristics curves being grouped together in a given single battery pack.

This method, in addition to an accompanying great decrease in production yield, required a complex, time-consuming process, which leads to a great and unavoidable increase in production cost, so that a decrease in production cost was strongly desired.

DISCLOSURE OF THE INVENTION

An object of the present invention is to improve on the above-noted shortcomings in the prior art, by providing a high-speed secondary cell charging system and a high-speed secondary cell charging apparatus which, regardless of whether a secondary cell is a singular cell or is made up of a plurality of cells, detects the time at which the secondary cell full-charge condition is reached during the charging operation, thereby being able at all times to charge a secondary cell to a full charge, and also to provide a charging system and a secondary cell charging apparatus capable of rejuvenating a secondary cell to a proper output voltage characteristics curve which, because of its history, has an improper output voltage characteristics curve, and capable of regenerating individual cells of a battery pack made up of a plurality of cells having mutually differing output voltage characteristics curves so as to have nearly the desired output voltage characteristics curve.

To achieve the above-noted object, the present invention has the following described technical constitution.

Specifically, a charging system according to the present invention is a charging system wherein, in charging a secondary cell while detecting the charging characteristics, executes charging processing of the secondary cell using a prescribed amount of current, in the case in which a pre-established condition with regard to the secondary cell is detected, charging of the secondary cell is performed again, using a current which is smaller than the above-noted prescribed amount of current, after which when the above-noted pre-established condition with regard to the secondary cell is detected, charging of the secondary cell is performed yet again, using a current which is smaller than the immediately previously used amount of current, the above-noted operations being repeated until the secondary cell achieves the condition in which the charging is substantially completed.

In a more concrete form of a charging system according to the present invention, in charging a secondary cell while detecting the charging characteristics of the secondary cell, there is a first time period, during which the secondary cell is charged using a first prescribed amount of current, a second time period, during which, in the case of detection of a pre-established condition in the secondary cell during the first time period, the secondary cell is charged again with a second amount of current that is smaller than the above-noted first prescribed amount of current, a third time period during which, in the case of detection of a pre-established condition in the secondary cell during the second time period, the secondary cell is charged again with a third amount of current that is yet smaller than the above-noted second prescribed amount of current, and a fourth time period, during which the operation of the above-noted third time period is repeated with an amount of current that is smaller than the previous prescribed amount of current, until the charging of the secondary cell is completed.

In addition, a secondary cell charging apparatus according to the present invention is formed by charging terminals for the secondary cell, a charging characteristics detection means which detects the charging characteristics of the secondary cell, a current-adjusting means which is connected to the above-noted charging terminals and also connected to a prescribed current source, and a current control means which is connected to both the above-noted detection means and the current-adjusting means, and which, in response to a signal output from the above-noted detection means, which indicates a pre-established condition with regard to the secondary cell, performs control of the above-noted current-adjusting means so as to either stop the current supplied to the above-noted charging terminals, or change the amount of current supplied to the charging terminals.

By virtue of their above-described constitutions, a charging system and a secondary cell charging apparatus according to the present invention, in addition to being able to perform high-speed charging of a secondary cell, reliably bring the secondary cell to nearly a fully charged condition in a short period of time, and are also capable of rejuvenating a secondary cell to a proper output voltage characteristics curve a secondary cell which has an improper output voltage characteristics curve due to its history, and additionally, even in a secondary cell which is formed from a plurality of cells having mutually differing output voltage characteristics curves, a charging system according to the present invention can be used to regenerate the individual output voltage characteristics curves of these cells so that they have nearly the desired output voltage characteristics curves.

BRIEF DESCRIPTION OF THE DRAWINGS

FIG. 9 is a drawing which illustrates the principle of the occurrence of a pseudo-peak in a secondary cell of the past.

DESCRIPTION OF THE PREFERRED EMBODIMENTS

Specific examples of the configuration of a charging system and secondary cell charging apparatus according to the present invention will be described in detail below, with reference being made to the relevant accompanying drawings.

Figure 1:
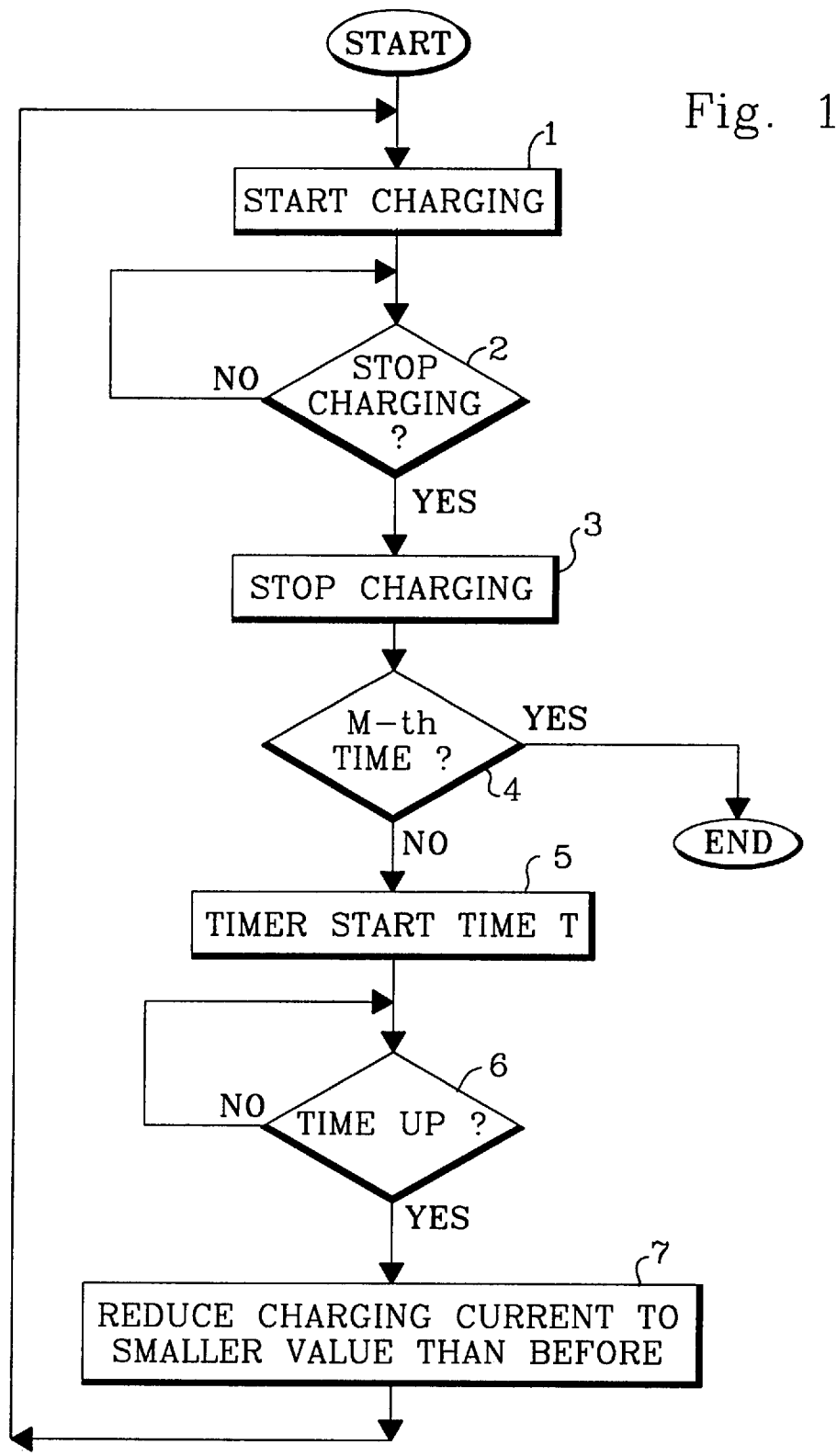
FIG. 1 is a flowchart which shows the processing sequence of a charging system according to the present invention.

FIG. 1 is a flowchart which shows the basic processing sequence in the charging system of the present invention. The basic constitution is that of a charging system which, as described above, when charging a secondary cell while detecting the charging characteristics of the secondary cell, executes charging processing of the secondary cell by using a current value characteristic of the secondary cell. In the case in which a pre-established condition with regard to the secondary cell is detected, charging of the secondary cell is performed again, using a current which is smaller than the above-noted prescribed amount of current, after which when the above-noted pre-established condition with regard to the secondary cell is detected, charging of the secondary cell is performed yet again, using a current which is smaller than the immediately previously used amount of current, the above-noted operations being repeated until the secondary cell achieves the condition in which the charging is substantially completed.

In the above-noted charging system according to the present invention, the secondary cell includes secondary cells such as lead batteries, nickel-cadmium batteries, nickel-hydrogen batteries, nickel-zinc batteries, and lithium ion batteries, which are capable of being recharged many times over their useful lifetime.

Additionally, in the present invention, the charged secondary cell can comprise a single cell, and can also be a secondary cell comprising a pack of a plurality of cells in a group, these cells being connected in series.

In the charging system according to the present invention, the charging characteristics of the secondary cell are detected, where these charging characteristics are not, however, limited in any particular manner. They can be the output voltage, the surface temperature of the secondary cell, the amount of gas internally generated within the secondary cell, the charging current during charging, or the charging time, these characteristic values being measured and recorded in real time as they vary along the time axis.

The charging system according to the present invention is one in which a pre-established condition with regard to the secondary cell is detected, this pre-established condition with regard to the secondary cell being during charging of a secondary cell, for example, at a pseudo-peak or pre-peak in the above-noted output voltage characteristics curve in which condition it is judged that the full-charge condition has been reached, although the full-charge condition has not substantially been reached.

In addition, it is possible to envision a case in which the output voltage of a secondary cell reaches a prescribed value, a case in which the charging current drops below a prescribed value or becomes extremely small, a case in which the surface temperature of the secondary cell rises suddenly, in the case in which the rate of rise of the voltage value drops below a prescribed value, a case in which there is no longer any change in the voltage value and the output voltage characteristics curve has become flat, and the case in which even though a prescribed amount of time has elapsed from the start of the charging operation, no peak or long-term flat condition occurs in the above-noted output voltage characteristics curve.

Therefore, in the present invention, when using the voltage output characteristics curve as the characteristic value, the use of the previously known negative-delta V method for detecting an output voltage peak of a secondary cell or detecting the rate of rise in the output voltage of the secondary cell to detect the case in which the rate of rise decreases or is zero corresponds to the one case of detecting a pre-established condition with regard to the secondary cell as in the present invention, there is no limitation placed on the detection method in the present invention.

In the present invention, it is possible to select the use of any characteristic value of the secondary cell, which is detectable by any method or means as is appropriate to the type of secondary cell.

It is necessary to establish the amount of charging current to be supplied to the secondary cell at the beginning of the charging, as noted above, in the present invention.

In the present invention, because one object is to complete the charging of a secondary cell within a short period of time or within several tens of minutes, it is desirable that the amount of charging current be large.

The amount of charging current used in the present invention will be expressed as the C-rate, which is a rate that indicates a multiplier with respect to the maximum charging current value C per unit time generally specified as a nominal value with regard to the secondary cell. (Refer to JIS standard C8705 (9).)

That is, for a secondary cell having a nominal capacity value of 1200 mAh, a charging current of 0.1 C would mean causing a current of 120 mA to flow in the secondary cell for a period of 1 hour, 2 C would mean causing a current of 1200 mA to flow in the secondary cell for 30 minutes, and 4 C would mean causing a current of 1200 mA to flow in the secondary cell for 15 minutes.

In the present invention, in starting the charging operation, in the case of selecting the pre-established current value as a 4 C charging current, for example, at the point at which the above-noted pre-peak or pseudo-peak is detected, the charging operation is interrupted.

At this point, because in many cases the secondary cell has not reached the full-charge condition, but is rather merely incapable of being charged further with a high charging current, the above-noted pre-established amount of current, for example 4 C, is varied and the charging operation is repeated or, more preferably, the amount of charging current used in the subsequent charging is made an amount of charging current that is smaller than the amount of charging current used the previous time. While an example of this could be to make it 2 C or 1 C, there is no particular limitation with respect to this in the present invention, it being possible to employ any value that is smaller than 4 C as the amount of charging current.

In the present invention, then, charging is again performed using, for example, an amount of charging current that is 2 C, and, as was done the previous time, a pre-established condition with regard to the secondary cell is detected.

However, in this subsequent charging operation, there are cases in which the above-noted pre-peak or pseudo-peak occurs again, and because in some cases the secondary cell will have substantially reached the full-charge condition, it is necessary to make a judgment with regard to both conditions with regard to the detection results.

For this reason, in the subsequent charging operation, in the case in which the pre-peak or pseudo-peak or a true peak is detected and the charging operation is stopped, in particular to detect the latter condition, it is desirable to separately detect the output voltage level of the secondary cell or to perform parallel detection of the internal gas generation condition, secondary cell surface temperature, and amount of current or the like, and to make a judgment of whether or not the secondary cell has substantially reached the full-charge condition, based on an overall judgment thereof.

In the present invention, in the first charging, one simple method that can be used to judge whether or not a pre-established condition has been reached at each charging operation is, for example, to detect and judge whether or not the output voltage of the secondary cell has reached a pre-established voltage.

That is, at each charging operation, in the case in which, for example, the pre-established secondary cell output voltage is 4.2 V, to stop the charging when the judgment is made that the above-noted pre-established condition has been reached.

As a result, in a subsequent charging operation, if it is possible to judge that the secondary cell has substantially reached the full-charge condition, it is necessary to stop the charging at that point, and if it is possible to judge that the secondary cell has not substantially reached the full-charge condition, the secondary cell is charged again, the amount of current being used in that subsequent charging being changed to an amount of current that is smaller than the amount of current that had been used.

In the subsequent charging operation as well, in the case in which it is possible to judge that the secondary cell has not substantially reached the full-charge condition, the above-noted charging operation or subsequent charging operation is repeated, this charging operation being repeated until it is possible to judge that the secondary cell has substantially reached the full-charge condition.

In the present invention, an example of a criterion used to judge that the secondary cell has substantially reached the full-charge condition is for example the condition described below.

Specifically, in the case of charging an activated secondary cell under a room temperature, there are the cases in which (1) the secondary cell has reached a condition in which 90% or greater of the nominal capacity value has been achieved, (2) the surface temperature rate of a temperature rise at the completion of the charging operation is 15 degrees or lower, (3) the terminal voltage of the secondary cell at the end of the charging operation is 1.9 V or lower per cell, and (4) the charging efficiency of the secondary cell is 95% or greater.

In addition, there are other cases, such as that in which (5) the output voltage value of the secondary cell has reached a pre-established voltage value, and (6) a pre-established amount of time has elapsed from the start of the charging operation on the secondary cell, in which cases the above-noted pre-established condition is not detected.

The degree of reduction (step down) of the charging current amount used in the present invention can be a fixed ratio with respect to the amount of current used in the first charging operation, and can also be a pre-established fixed difference of current which is successively subtracted from the amount of charging current previously used, and can further be not a fixed ratio or difference for each charging operation, but rather be varied as required each time.

For example, it is possible that the above amount of current be in a sequence such as 2 C, 1 C, 0.5 C, 0.25 C, or 4 C, 3 C, 2 C, 1 C, and it can also be in a sequence such as 4 C, 3 C, 1 C, 0.25 C.

Figure 2:
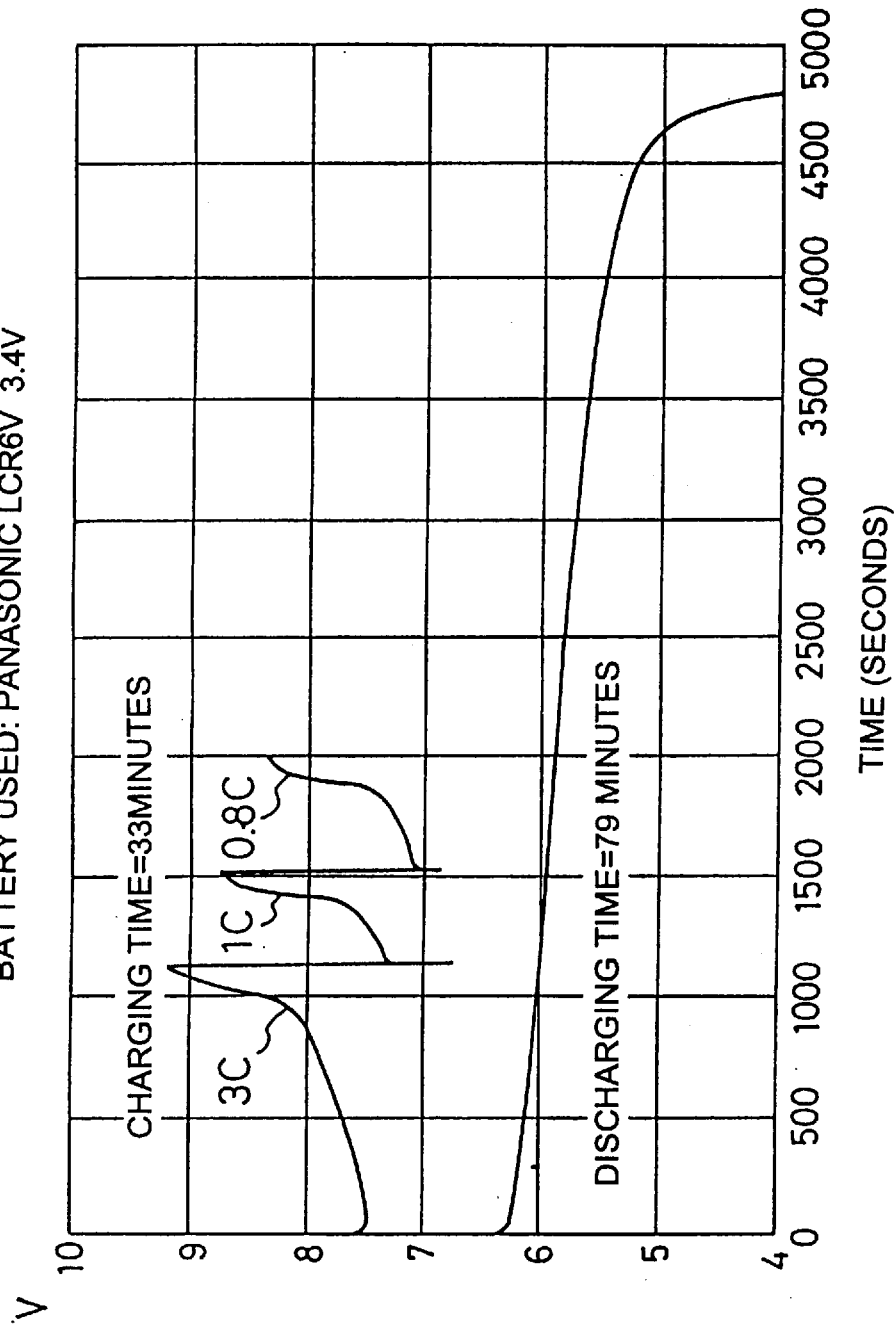
FIG. 2 is a graph which shows the operation of a charging system according to the present invention.

FIG. 2 shows an example of the case of actually executing a charging operation in the present invention.

In the example shown in FIG. 2, charging is performed 3 times, the amount of charging current being stepped down in the sequence 3 C, 1 C, 0.8 C with a charging time of 33 minutes, the thus-obtained discharging characteristics, as shown in FIG. 2, exhibiting a discharging time of 79 minutes, this indicating that the secondary cell is capable of exhibiting sufficient power.

Figure 3:
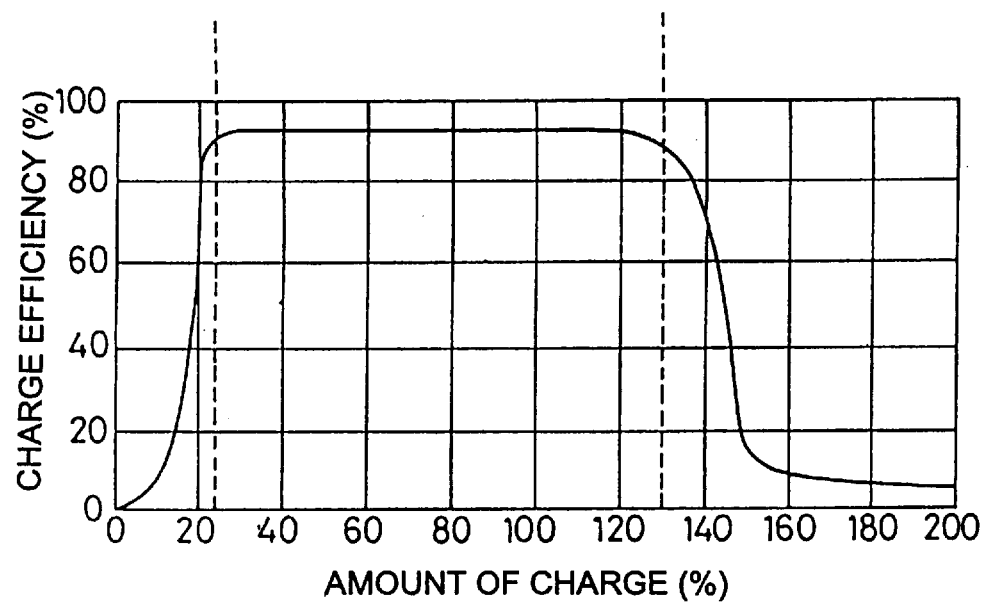
FIG. 3 is a graph which shows the charging efficiency of a secondary cell.
Figure 7:
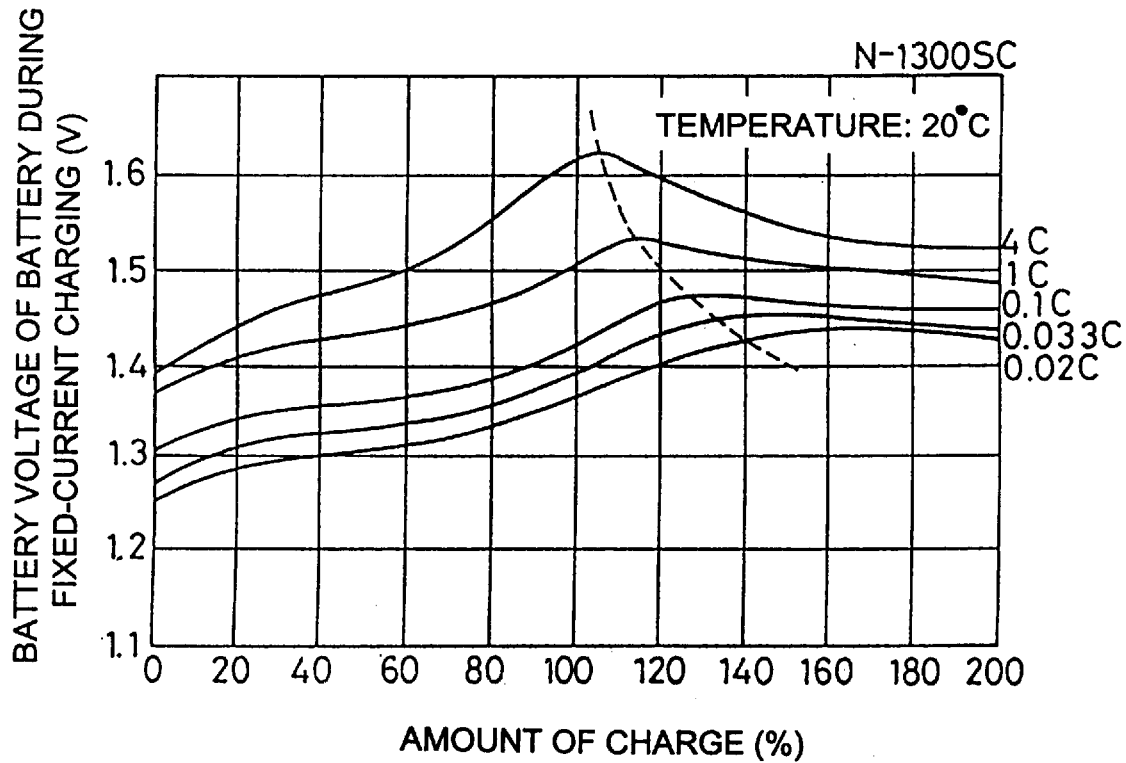
FIG. 7 is a graph which shows the relationship between the amount of charge and the battery voltage obtained by a secondary cell charging method of the past.
Figure 8:
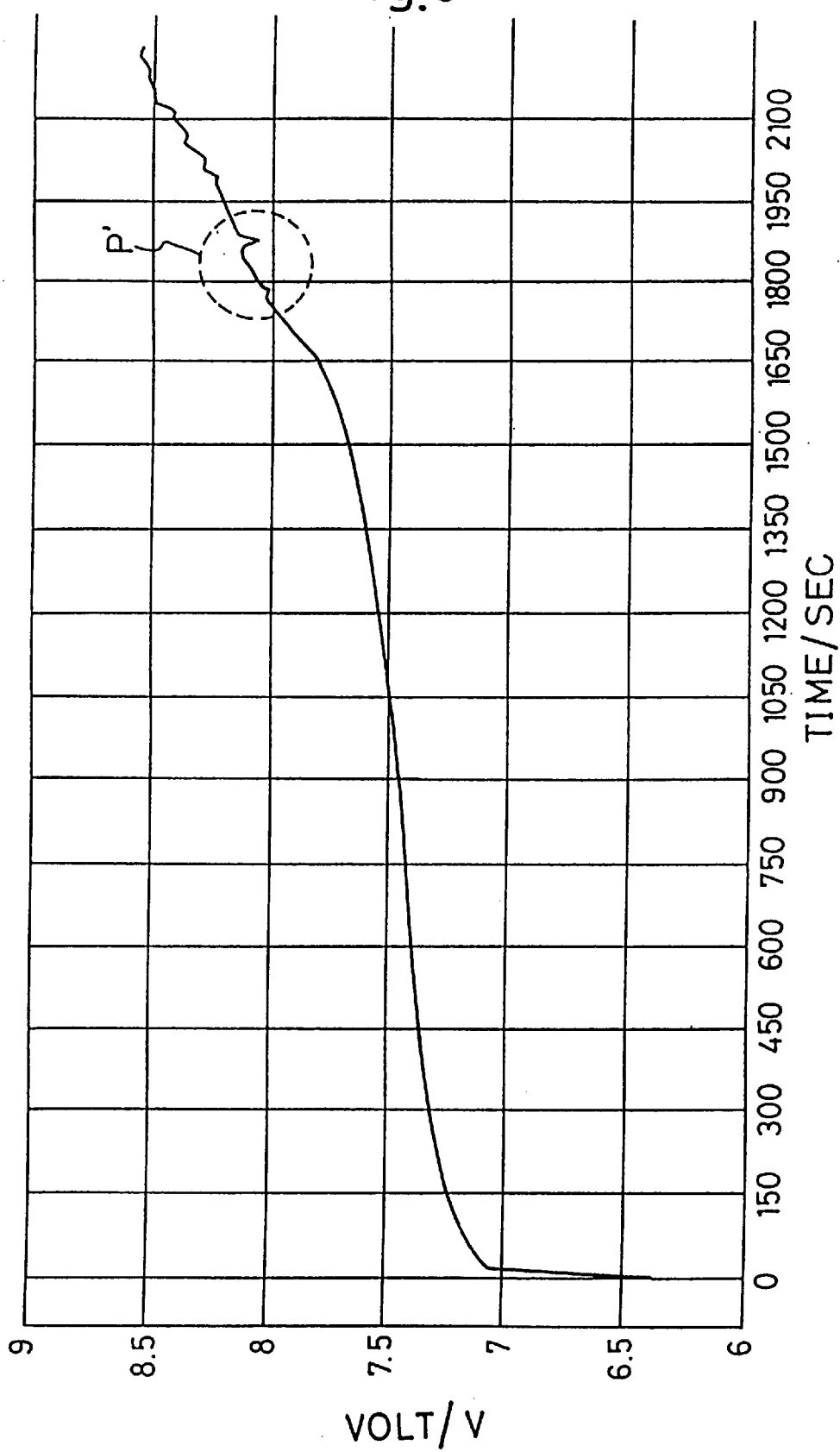
FIG. 8 is an output voltage characteristics curve which shows the condition in which a break peak occurs in a secondary cell.
Figure 10:
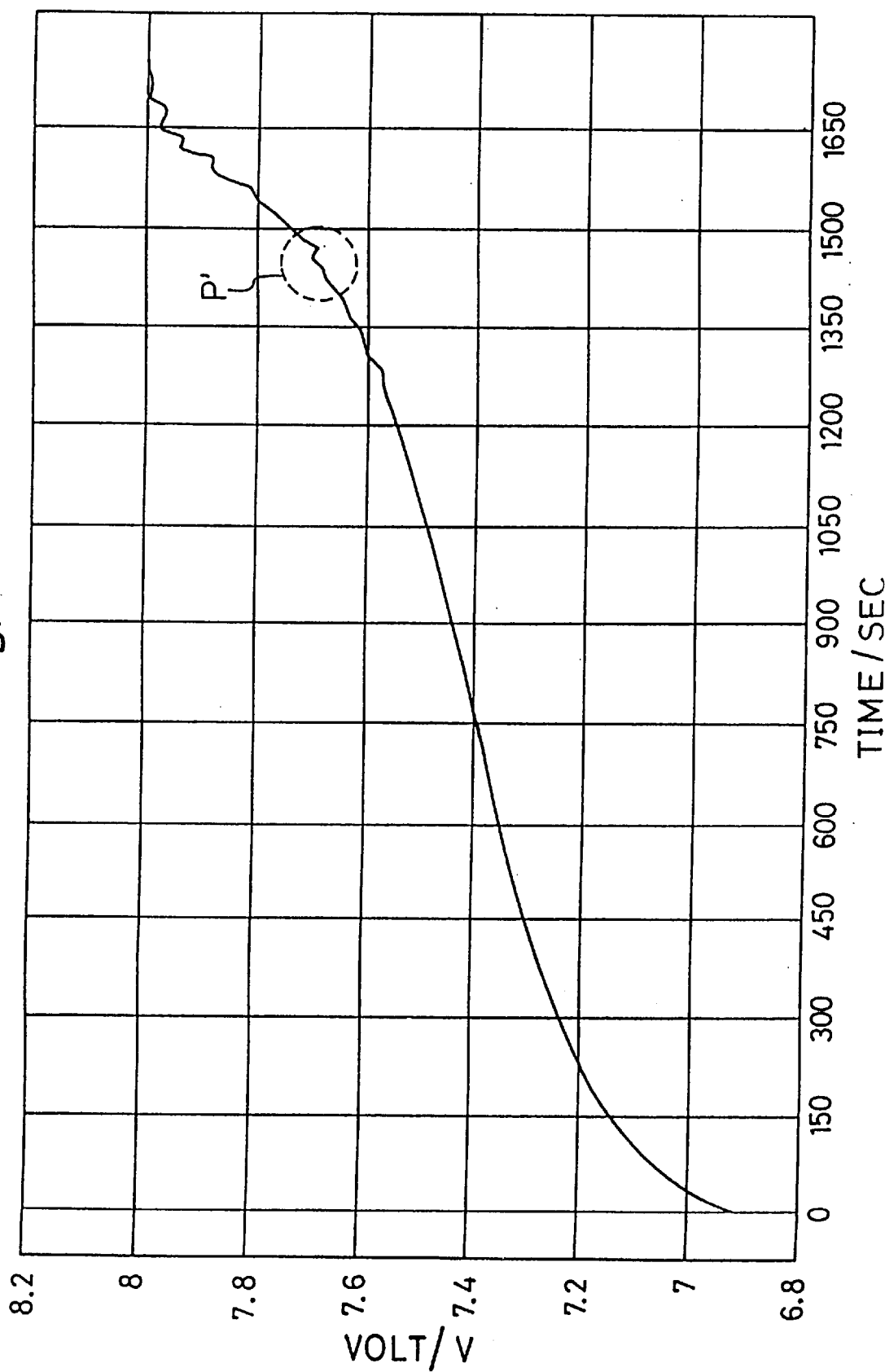
FIG. 10 is a graph which shows the condition in which a pre-peak occurs in charging a secondary cell of the past.
Figure 11:
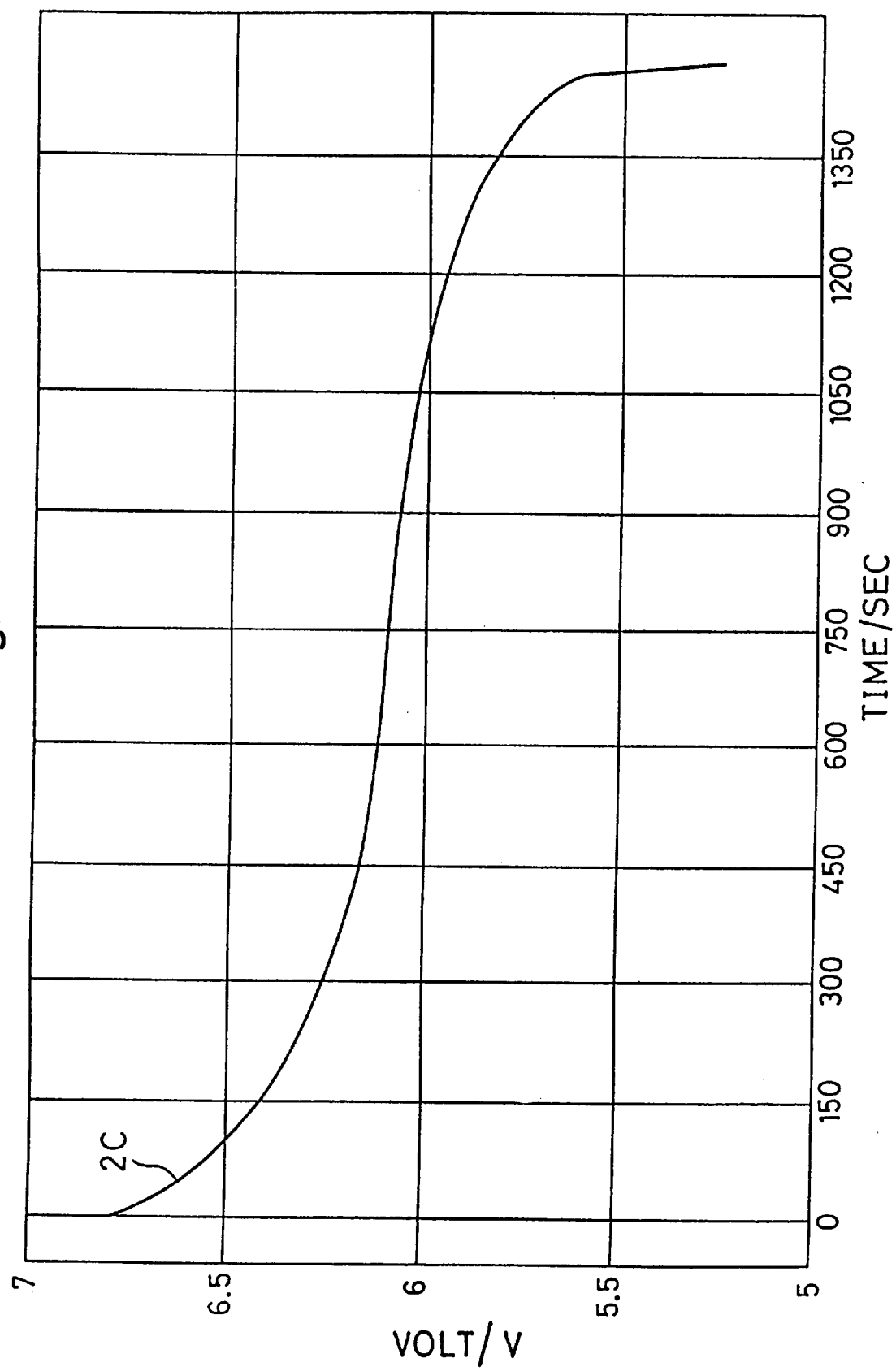
FIG. 11 is a graph which illustrates the discharging characteristics of a secondary cell in which a pre-peak has occurred.

Specifically, the basic technical constitution of a charging system according to the present invention is as follows. As shown in FIG. 7, the position at which a peak occurs in the output voltage characteristics curves for a secondary cell during a charging operation occurs earlier the higher the amount of charging current (that is the charging rate or C rate), and as shown in FIG. 3, the characteristics indicated by a worsening of the charging efficiency as the full-charge condition is approached is used to (1) wait until the stopping of the charging at a pre-established charging rate or C rate of C". Then, (2) the charging rate "C" is lowered to C/N and a charging operation is performed again, waiting until the stopping of charging. Thereafter (3) the operation (2) is repeated until the secondary cell substantially either reaches the full-charge condition.

That is, in the present invention, a cell of the secondary cell which contributed to the charging in (1) reaches a virtual full-charge condition by virtue of a pre-peak below the charging rate of "C" or, in the case of a secondary cell comprising a plurality of cells in combination, some of the cells temporarily reach the full-charge condition below the charging rate "C."

Thereafter, in (2), a cell of the secondary cell which contributed to the charging again reaches a virtual full-charge condition by virtue of a pre-peak below the charging rate "C"/N, or the charging operation is stopped by reaching the normal full-charge condition, or else in the case of a secondary cell comprising a plurality of cells in combination, some of the not fully charged cells reach the full-charge condition at below the charging rate of "C"/N, thereby causing the charging operation to stop.

At this step, because the charging rate is "C"/N, there is almost no damage to the cell caused by overcharging, and also because the charging efficiency is greatly worsened at this point, the effective amount of charging does not suddenly increase. Additionally, the above-noted value of N in the present invention need not be an integer.

Therefore, by repeating the above-noted operation, in the case of a single-cell secondary cell, it is possible to reliably reach the full-charge condition, and in the case of a secondary cell comprising a plurality of cells in combination, it is possible for each cell to reach the full-charge condition at below the final charging rate.

As a result, particularly in the case of a secondary cell comprising a plurality of cells in combination, because all cells are charged to almost the same condition, even if subsequent deep discharging is done, the over-charged condition of some of the cells does not occur, as was a problem in the past, and furthermore if a charging operation by a charging system according to the present invention is first performed, because each cell is adjusted to approximately the same output voltage characteristics curve, packed cells exhibiting the above-noted pseudo-peak, which was a problem in the past, the above-noted pseudo-peak does not appear in subsequent charging operations, thereby enabling not only efficient charging, but also effective output of power from the secondary cell.

This effect can be achieved even in the case of a secondary cell comprising a single cell.

In addition, by providing a charging operation stopping means in the charging operation, the operating effect of a charging system according to the present invention as noted above can be applied to all secondary cells as noted above thereby enabling the achievement of the full-charge condition in a short period of time and without subjecting the cell to damage.

In a more specific example of a charging system according to the present invention, in charging a secondary cell while detecting the charging characteristics of the secondary cell, there is a first time period, during which the secondary cell is charged using a first prescribed amount of current, a second time period, during which, in the case of detection of a pre-established condition in the secondary cell during the first time period, once the charging operation to the secondary cell is stopped for a predetermined period and after that the secondary cell is charged again with a second amount of current that is smaller than the above-noted first prescribed amount of current, a third time period during which, in the case of detection of a pre-established condition in the secondary cell during the second time period, once the charging operation to the secondary cell is stopped for a predetermined period and after that the secondary cell is charged again with a third amount of current that is yet smaller than the above-noted second prescribed amount of current, and a fourth time period, during which the operation of the above-noted third time period is repeated with an amount of current that is smaller than the previous prescribed amount of current, until the charging of the secondary cell is completed.

In a charging system according to the present invention, in each of the above-noted time periods, the charging operation is temporarily stopped for a given time period, and when transitioning to the next time period the amount of charging current, which is the C rate, is first stepped down, after which transition is made to the next time period, and when doing this it is desirable to insert a prescribed waiting time period between the above-noted operation time period and the transition to the next time period.

This is because polarization normally occurs at the electrodes of a secondary cell when performing the above-noted charging operation, so that the output voltage of the secondary cell is higher than the true voltage value, making it necessary to measure the output voltage after removing the internal polarization and allowing the output voltage to stabilize.

This waiting time can be set as a fixed value of, for example, several seconds.

In the above-noted charging system according to the present invention, it is necessary to make a judgment of whether or not the secondary cell which is being charged has substantially reached the full-charge condition, and an example of a method of doing was described above.

For the purpose of simplifying the execution of this judgment, it is possible to count the number of times the charging in each of the above-noted processing time periods was stopped, and to make the judgment that the secondary cell has substantially reached the full-charge condition and stop the charging operation when a prescribed number of times M is reached.

For example, in the above case, the step-down processing is continued, and when the above-noted charging operation is stopped 3 times (when the prescribed number is 3), the secondary cell is judged to have substantially reached the full-charge condition, and the above-noted charging operation is stopped.

The above-noted integer M can be set and changed as is appropriate to the the type of battery, conditions of usage, and the like.

In the present invention, the overall number of times M of stopping the above-noted charging operation is preferably set to a value of at least 2.

This means that, in the present invention, the amount of charging current is changed at least two times when performing the charging operation.

In the present invention, another simple method is that of judging that the secondary cell has substantially reached the full-charge condition by detecting whether or not the output voltage value of the secondary cell which is being charged has reached a pre-established voltage value, and additionally it is also possible to judge that the secondary cell has approximately reached the full-charge condition when the amount of charging current with respect to the secondary cell has either fallen below a pre-established value or has become extremely small.

In the case in which the above-noted condition which can cause stoppage of the charging operation is not detected even though the prescribed amount of time has elapsed from the start of the charging operation, it is possible to adopt the method of stopping the charging operation as a safety consideration as well.

Specifically, in charging a secondary cell while detecting the charging characteristics of the secondary cell, when charging the above-noted secondary cell using a current that has a pre-established value that is characteristic to the above-noted secondary cell, in the charging step there is included a first step which temporarily interrupts the charging operation in the case in which a pre-established condition with regard to the above-noted secondary cell is detected. When subsequently charging the above-noted secondary cell using a current that has a value that is smaller than he above-noted pre-established value, there is a second step which stops the charging operation in the case in which the above-noted pre-established condition with regard to the secondary cell is detected. This second step is then repeated. When the above-noted charging operation has been stopped a pre-established number of times, the secondary cell is treated as having substantially reached the full-charge condition, and the charging operation is stopped.

In the case in which the secondary cell being used in the present invention comprises a plurality of cells in combination, the secondary cell is comprised of a plurality of cells having mutually the same nominal capacity, and it is possible for each of the cells to have the same condition, or for one or more of the cells to have a condition that is different than the condition of the other cells.

The operating sequence of an example of a secondary cell charging system as noted above according to the present invention will be described with reference to the flowchart presented in FIG. 1.

Specifically, after the start, at step (1) a pre-established amount of charging current (hereinafter referred to as the C rate) is set and a charging operation is started.

At step (2) a judgment is made as to whether the condition has been detected in which the output voltage characteristics curve of the secondary cell is in a pre-established condition and if the result of that judgment is N (no), the detection operation is continued.

If, however, the result of the judgment is Y (yes), processing proceeds to step (3), at which the above-noted charging operation is stopped. Then, at step (4), a judgment is made as to whether the number of times of the stopping operation has reached a pre-established number of times M.

If the result of that judgment is Y (yes), the above-noted charging operation is stopped. If, however, the result is N (no), processing proceeds to step (5), at which a timer is started, after which, at step (6), a judgment is made as to whether or not a pre-established amount of time has elapsed. If the result of that judgment is N, the calculation operation is repeated.

If, however, the result of the judgment is Y, the judgment is made that the time-up condition has been reached, and processing proceeds to step (7), at which the charging current rate C is selected as a value that is smaller than the C rate currently being used (for example C/N, where N is an arbitrarily selected integer or non-integer value, or fixed value, or a variable).

Thereafter, return is made to step (1), the charging of the secondary cell with the newly set value of charging rate C is started, and each of the above-noted steps is repeated.

Next, a specific example of the configuration of a charging apparatus for the purpose of executing the charging system noted above will be described, with reference being made to FIG. 4 through FIG. 7.

Figure 4:
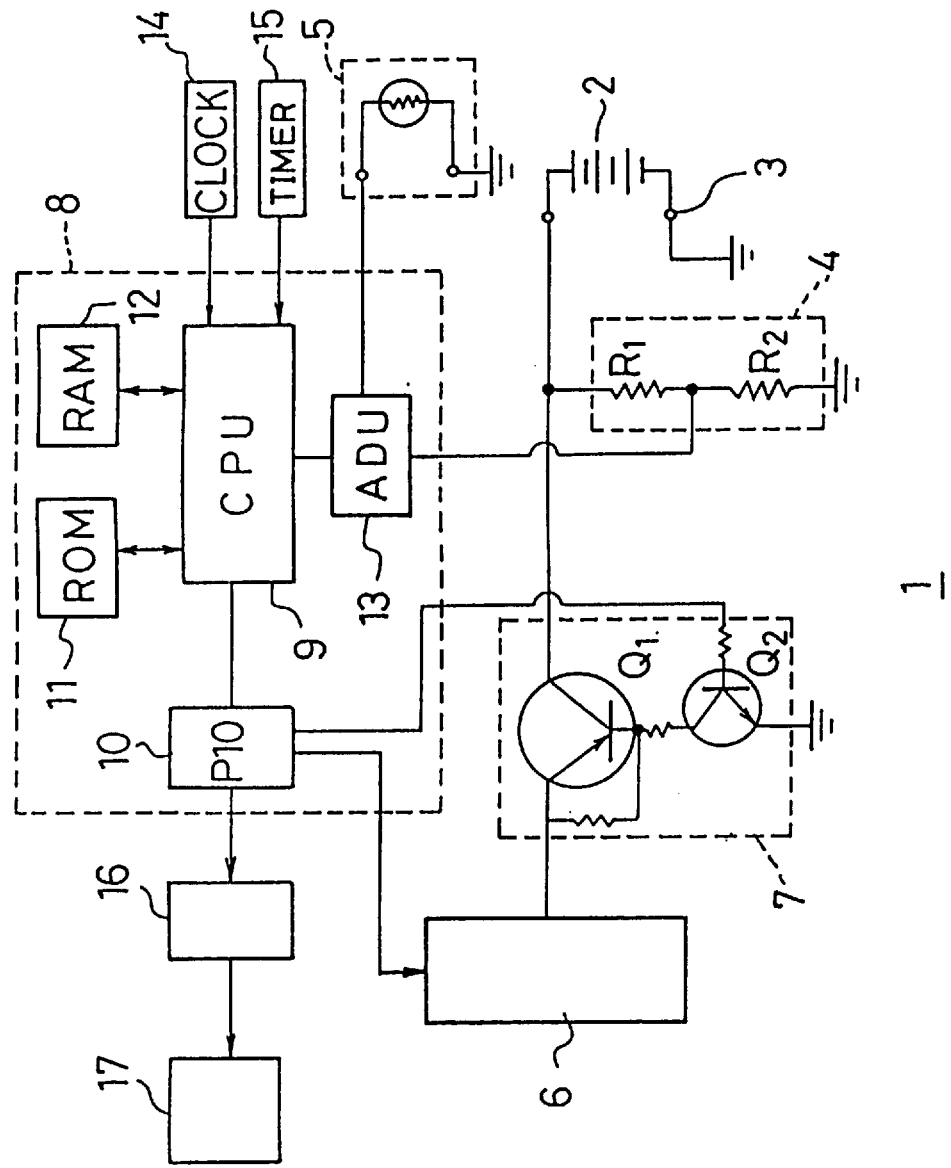
FIG. 4 is a block diagram which shows a specific example of the configuration of a secondary cell charging apparatus according to the present invention.

FIG. 4 is a block diagram which shows the configuration of an example of a charging apparatus 1 according to the present invention, this drawing showing a secondary cell charging apparatus 1 having a charging terminal 3 for a secondary cell 2, a detection means 4 and 5 for detecting the charging characteristics of the secondary cell 2, a current-adjusting means 7 which is connected to the above-noted charging terminal 3 and which is connected also to a prescribed current source 6, and a control means 8 which is connected to detection means 4 and 5, and the current adjusting means 7 and which, in response to either a detection signal output from the detection means 4 and 5 which indicates the completion of charging of the secondary cell 2 or to a detection signal which indicates a condition established in a condition before the completion of charging of the secondary cell, controls the above-noted current-adjusting means 7 so as to either stop the supply of current to the charging terminal 3 or cause a change in the amount of current supplied to the charging terminal 3.

In the charging apparatus 1 according to the present invention, the detection means 4 has a function of detecting the output voltage characteristics curve of the secondary cell 2 and, specifically, extracts the output voltage of the secondary cell as the divided voltage from the point of connection between the resistances R1 and R2, this voltage being passed as information via the A/D converter 13 provided in the control means 8 to the central processing unit (CPU) 9.

The detection means 5 has a function of detecting the surface temperature of the secondary cell and specifically, is formed by a thermistor, the output data from which is passed as information in the same manner to the CPU 9 via the A/D converter 13 provided in the control means 8.

This thermistor comprises a resistance element that exhibits negative resistance characteristics for the purpose of measuring the surface temperature of the secondary cell 2.

In the present invention, the above-noted detection means can be either one of the above-noted detection means 4 and 5, and can also be a different detection means than these two, and can further be a combination thereof.

A programmable power supply is used as the above-noted current source 6, this being a fixed-current source which is capable of generating a charging current as a C rate that is responsive to a control signal from the control means 8.

The above-noted current-adjusting means 7 comprises a driver transistor Q2 which is driven by a signal from the control means 8, and a switching transistor Q1 which is driven by this transistor Q2, this current-adjusting means supplying a charging current from the programmable power supply 6 to the secondary cell.

The control means 8 comprises CPU 9 as the central processing unit, A/D converter 13, ROM 11, RAM 12 and parallel input/output (PIO) means 10, this parallel input/output means 10 being directly connected to the current-adjusting means 7 and the programmable power supply 6.

The above-noted ROM is a dedicated memory for the purpose of writing and reading a program and various lookup tables for the CPU 9, and the above-noted RAM is a read/write memory for storage of data read by peripheral devices of the CPU 9 and for use as working memory for calculations.

The control means 8 is also connected to a clock means 14 which is directly connected to the CPU 9 and which generates a reference signal for the basic operating step, and to a timer means 15 which has a function that interrupts the CPU 9 each given time interval and which also serves as a counter to check on the elapse of time. For example, when performing charging of the secondary cell, when the prescribed charging current is set and the charging operation is started, if a prescribed condition is detected, this counter can be used to control the period during which the charging operation is temporarily interrupted and the starting and stopping times of operating cycles. Additionally, it can be used to control the set period of time from the start of the first charging operation with respect to the secondary cell to the completion of the final charging operation of the secondary cell.

In addition, in a charging apparatus according to the present invention, a display means 17 is connected to the CPU 9 via an encoder 16.

This display means 17 can be used to display 7-segment data and the encoder 16 has a function which performs conversion to codes for a 7-segment display.

Therefore, in the charging apparatus shown in FIG. 4, each time the charging operation is stopped during each of the above-noted periods, based on a command signal from the CPU 9, a charging current having a C rate that is smaller than the charging current C rate used the previous time is generated from the programmable power supply 6, so that a charging operation is performed using that charging current.

Figure 5:
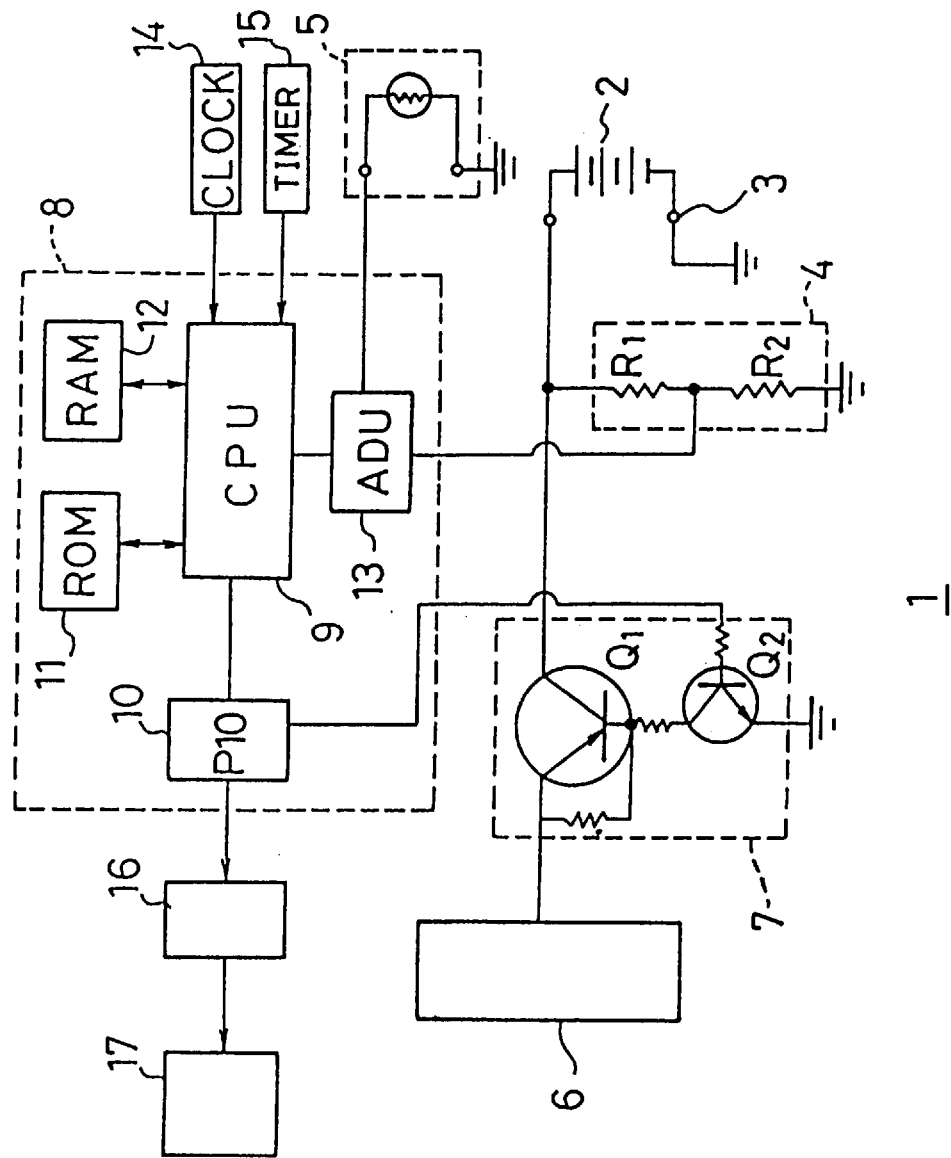
FIG. 5 is a block diagram which shows a different specific example of the configuration of a secondary cell charging apparatus according to the present invention.
Figure 6:
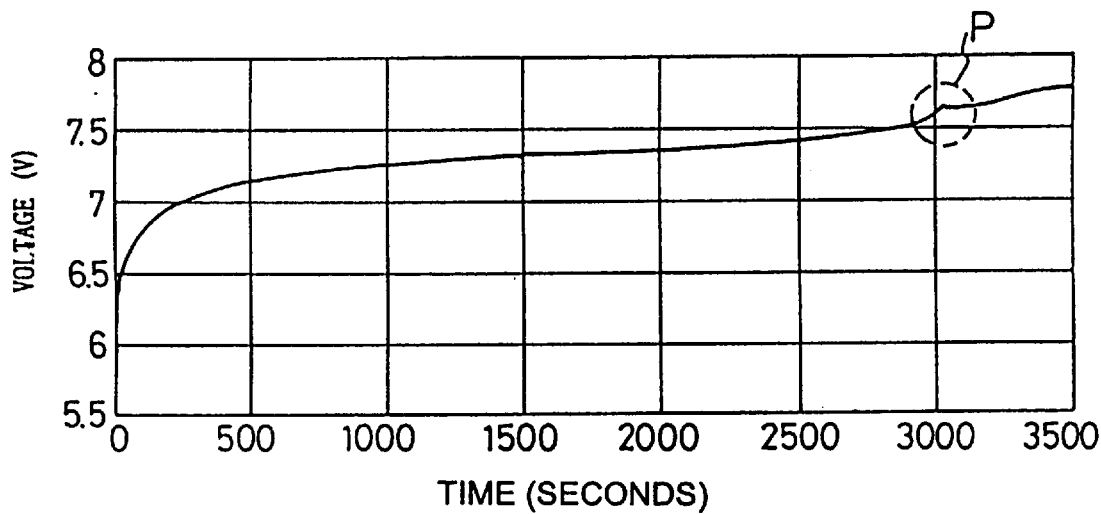
FIG. 6 is a graph which shows the output voltage characteristics curve obtained by a secondary cell charging method of the past.

FIG. 5 is a block diagram of another example of a configuration of a charging apparatus according to the present invention, in which the basic configuration is the same as the charging apparatus shown in FIG. 4, with the exception that the power supply 6 in this case is a fixed-current power supply, the current-adjusting means 7 in this case adjusting the duty cycle which is output from the parallel input/output (PIO) means 10 provided in the CPU 9, so as to provide drive by means of a pulse signal. The configuration is such that, by changing the duty cycle, the charging current C rate is varied.

Therefore, in the first charging operation, the ON ratio of the pulse signal output from the above-noted parallel input/output (PIO) means 10 is relatively large, and in subsequent charging operations, it is set so that the ON ratio of this pulse signal is made progressively smaller, thereby enabling the reduction of the charging current C rate.

Next, a charging apparatus which is a hardware implementation of the above-noted charging system according to the present invention will be described.

Figure 12:
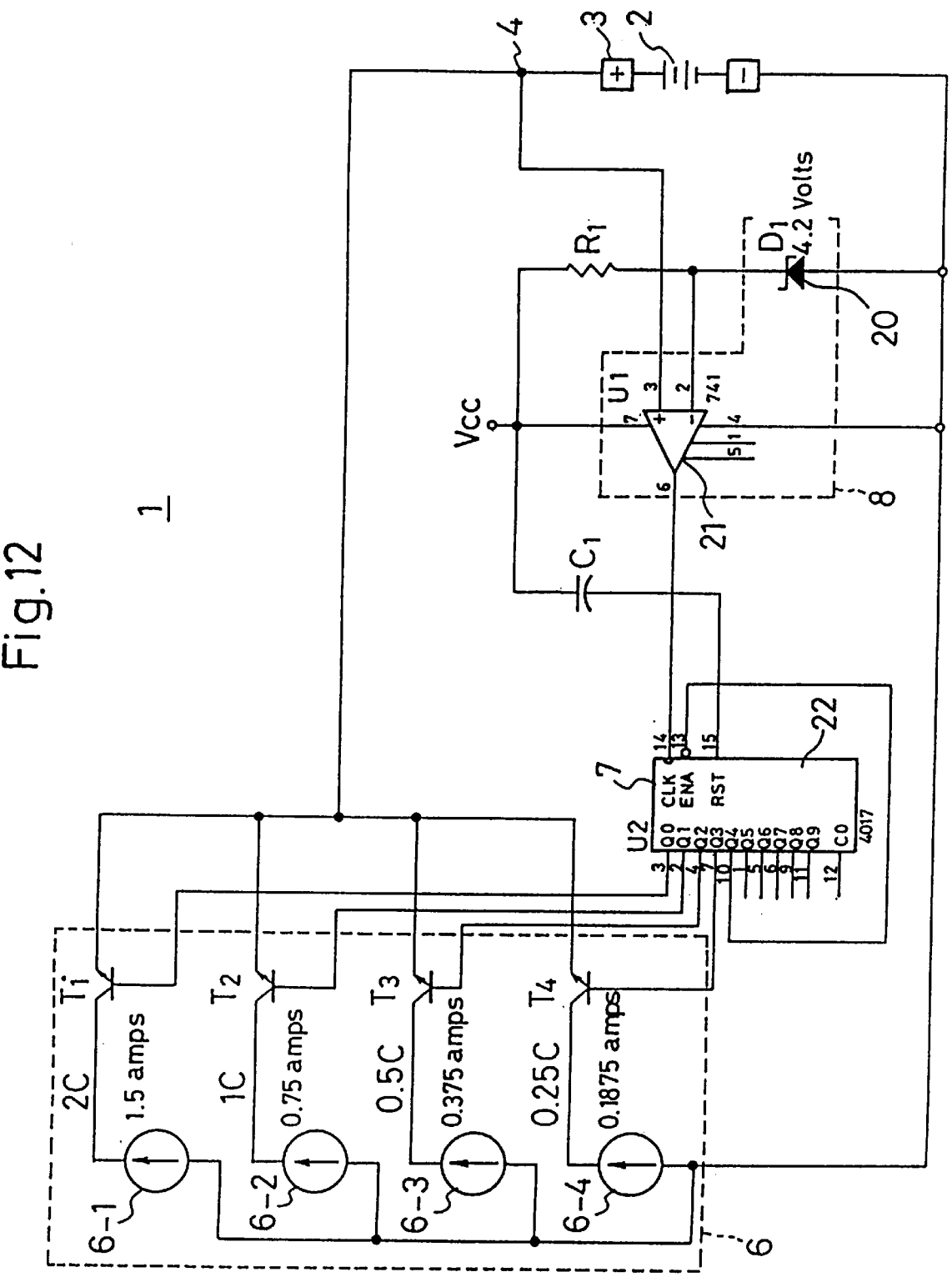
FIG. 12 is a block diagram which shows the a different specific example of the configuration of a secondary cell charging apparatus according to the present invention.

FIG. 12 is a block diagram which shows a charging apparatus 1 according to the present invention which is designed on the premise of use with the secondary cell 2 (a 3.6 V/750 mA lithium ion battery or lead battery, for example).

This charging apparatus is provided with a charging terminal 3 for the charging of the secondary cell 2, a detection means 4 for detecting the output voltage, which is a charging characteristic of the secondary cell 2, and a control means 8 formed by a comparator 21 to which are input the output signal of the detection means 4 and a reference voltage signal which is output from an appropriate reference voltage power supply 20.

The output of the control means 8 is connected to the current-adjusting means 7, which comprises a counter 22. The current-adjusting means 7, in response to the output of the control means 8, operates so as to vary the charging current C rate.

In this example, selection is made by the control means 8 of any one of the fixed-current power supplies (6-1, 6-2, 6-3, and 6-4), each having mutually differing output currents, which form the power supply 6, so as to select a charging current with the required C rate for charging the secondary cell.

That is, by setting the reference voltage to, for example, 4.2 V, during each of the charging operations, in the case in which the output voltage from the secondary cell 2 exceeds the reference voltage, an ON signal is output from the comparator 21 of the above-noted control means 8, this being input to the CLK clock signal terminal of the counter 22 provided in the current-adjusting means 7.

The setting of this reference voltage to 4.2 V is because the secondary cell will be taken to be in the full-charge condition if its output voltage is approximately 4.2 V.

The above-noted counter 22 selects one of the output terminals in the sequence Q0 through Q3 each time the ON signal is input to the clock signal terminal CLK thereof, thereby outputting the ON signal therefrom.

At the power supply group 6, the four fixed-current power supplies 6-1, 6-2, 6-3, and 6-4 are each connected respectively to control transistors T1 through T4, which are in turn connected to the output terminals Q0 to Q3.

The four fixed-current power supplies 6-1, 6-2, 6-3, and 6-4 of the power supply group 6 are designed so as to output a current of 1.5 mA, 0.75 mA, 0.375 mA, and 0.1875 mA, respectively, so that they generate charging currents of 2 C, 1 C, 0.5 C, and 0.25 C, respectively, with respect to the secondary cell 2.

In this charging apparatus 1, first in the first charging operation, the fixed-current power supply 6-1 is driven by the ON signal from the output Q0 of the counter 22, so that the secondary cell 2 is charged by supplying it with a 2 C charging current.

If the output voltage of this secondary cell reaches 4.2 V, an ON signal is output from the comparator 21 of the control means 8, this being input to the clock signal terminal CLK of the counter 22 provided in the current-adjusting means 7, causing the Q0 output thereof to be switched OFF and the Q1 output thereof to be switched ON, this action causing selection of the fixed-current power supply 6-2, so that the second charging operation, in which the secondary cell 2 is supplied with a 1 C charging current, is started.

Thereafter in the same manner, each time the output voltage of the secondary cell 2 reaches the reference voltage in each of the charging operations, the charging current C rate is made successively lower than the charging current C rate used in the previous charging operation, and the charging operation is repeated. When the fourth charging operation is completed, the charging operations are stopped.

In the above-noted example, the operation of inserting a waiting time between each of the charging operation to eliminate the overvoltage condition in the output voltage from the secondary cell has been omitted.

Figure 13:
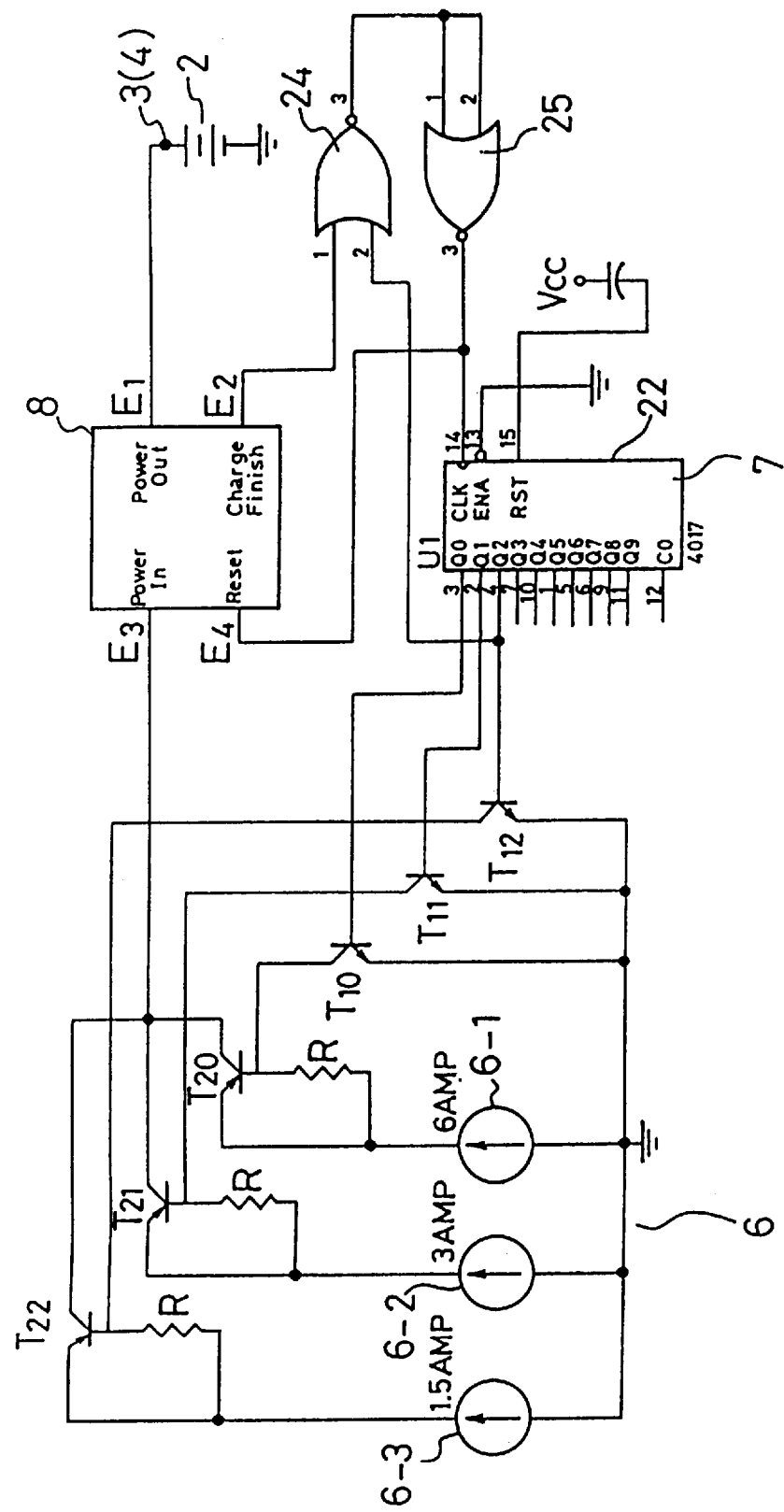
FIG. 13 is a block diagram which shows yet another specific example of the configuration of a secondary cell charging apparatus according to the present invention.

FIG. 13 is a block diagram that illustrates another example of the configuration of a charging apparatus according to the present invention.

The configuration is basically the same as shown in FIG. 12, this being a block diagram of a charging apparatus 1 which is designed for use with not only lead batteries, but also with nickel-cadmium batteries, nickel-hydrogen batteries and nickel-zinc batteries. The charging terminal 3 for the secondary cell 2 and the detection means 4 for detecting the output voltage of the secondary cell 2 are the same. The output signal from the detection means 4 is connected to the output terminal E1 (Power Out) of the control means 8, and a calculation is performed within the control means 8 as to whether or not the output voltage of the secondary cell has reached a pre-established condition.

The output terminal (Power Out) of the control means 8 also, of course, serves as the charging current supply terminal of the secondary cell 2.

In the control means 8 shown in this example, a judgment is made as to whether or not the output voltage of the secondary cell 2 has exceeded a peak or whether the rate of rise of the output voltage of the secondary cell 2 has fallen to below a prescribed value, thereby determining whether or not to stop the charging operation, and if, based on this judgment, the charging operation is to be stopped, an output signal is output from the terminal E2 (Charge Finish) of the control means 8.

A prescribed charging current from the power supply means 6 is input to the terminal E3 (Power In) of the control means 8, and the terminal E4 (Reset) of the control means 8 is connected to the clock signal terminal CLK of the counter 22 which is provided in the current-adjusting means 7.

In this example, in contrast to the example shown in FIG. 12, between the output terminal E2 of the control means 8 and the clock signal terminal CLK of the counter 22 provided in the current-adjusting means 7, a NOR gate circuit 24 and an inverter INV 25 are provided. A charging operation stop signal which is output from the terminal E2 (Charge Finish) of the control means 8 passes via this NOR gate circuit 24 and inverter INV 25 and is input to the clock signal terminal CLK of the counter 22.

The charging operation stop signal which is output from the inverter INV 25 is connected to the terminal E4 of the control means 8, the results of the calculation performed within the control means 8 being reset each time the charging operation stop signal is output.

The control relationship between the transistors Q0 through Q2 of the counter 22 in the current-adjusting means 7, and power supply group 6, which is formed by the three fixed-current power supplies (6-1, 6-2, and 6-3), each having a different output voltage, and which are controlled by the transistors T10 through T12 and transistors T20 through T22 is the same as shown in 12, and will not be described in detail herein.

In this example, by means of the third charging operation, after executing a charging operation with respect to the secondary cell 2 using the smallest charging current C rate, which is output from the fixed power supply 6-3, because the NOR gate is set to the disabled state, no signal from the control means 8 is input to the clock signal terminal CLK of the counter 22, so that the charging operation is stopped.

In the above-noted charging apparatus 1, of course, it is also possible for the control means 8 to additionally include a clock means and a timer means.

The above-noted timer means temporarily interrupts the charging operation by the charging current of a prescribed amount, and provides a waiting time period before the start of a subsequent charging operation with an amount of charging current that is smaller than the previously used amount of charging current.

As noted above, the detection means 4 which detects a charging characteristic of the secondary cell is connected to a means for detecting the output voltage of the secondary cell or the surface temperature of the secondary cell.

As is clear from the above description, when the above-noted control means 8 of a charging apparatus 1 according to the present invention, in response to the charging stop signal from the detection means 8, changes the charging current supplied to the charging terminal, it changes it so as to make the newly set charging current smaller than the charging current was the previous time.

The case of performing a charging operation of a lithium ion battery (3.6 V/750 mA) using the charging apparatus 1 which is shown in FIG. 12 will be described below, with reference being made to FIG. 14 through FIG. 16.

Figure 14:
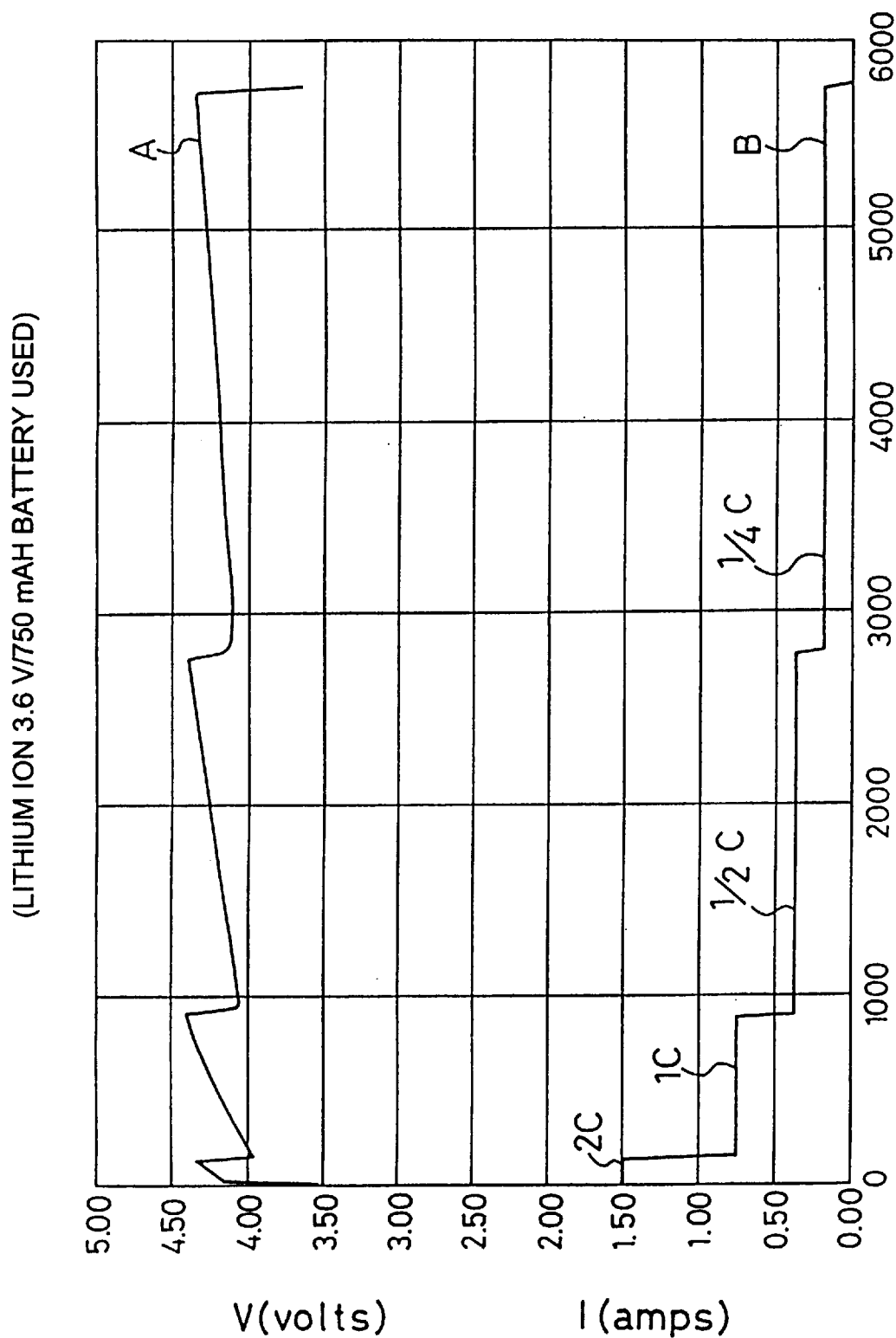
FIG. 14 is a graph which shows the process of charging a secondary cell using a charging processing system according to the present invention.

Specifically, the curve A shown in the graph of FIG. 14 shows the output voltage characteristics curve of a secondary cell 2 in the case of charging it with the above-noted charging operation according to the present invention, while the curve B of the same drawing indicates the change in the amount of charging current, that is, C rate, in the case of performing charging operations according to the present invention.

In the present invention, in the first charging operation (first time period), a charging operation is performed with a 2 C charging current, and at a very early point, a pre-established condition, such as a pre-peak or pseudo-peak, or a preset reference voltage is detected, at which point the charging operation is temporarily interrupted and the next charging operation (second time period) is performed after changing the charging current C rate to 1 C. The same type of detection as noted above is made after a small amount of time has elapsed, at which point the charging current C rate is decreased, and the third charging operation (third time period) is performed.

Thereafter, repetition is made for the third and fourth time periods, the charging operations being stopped in approximately 6000 seconds.

Figure 15:
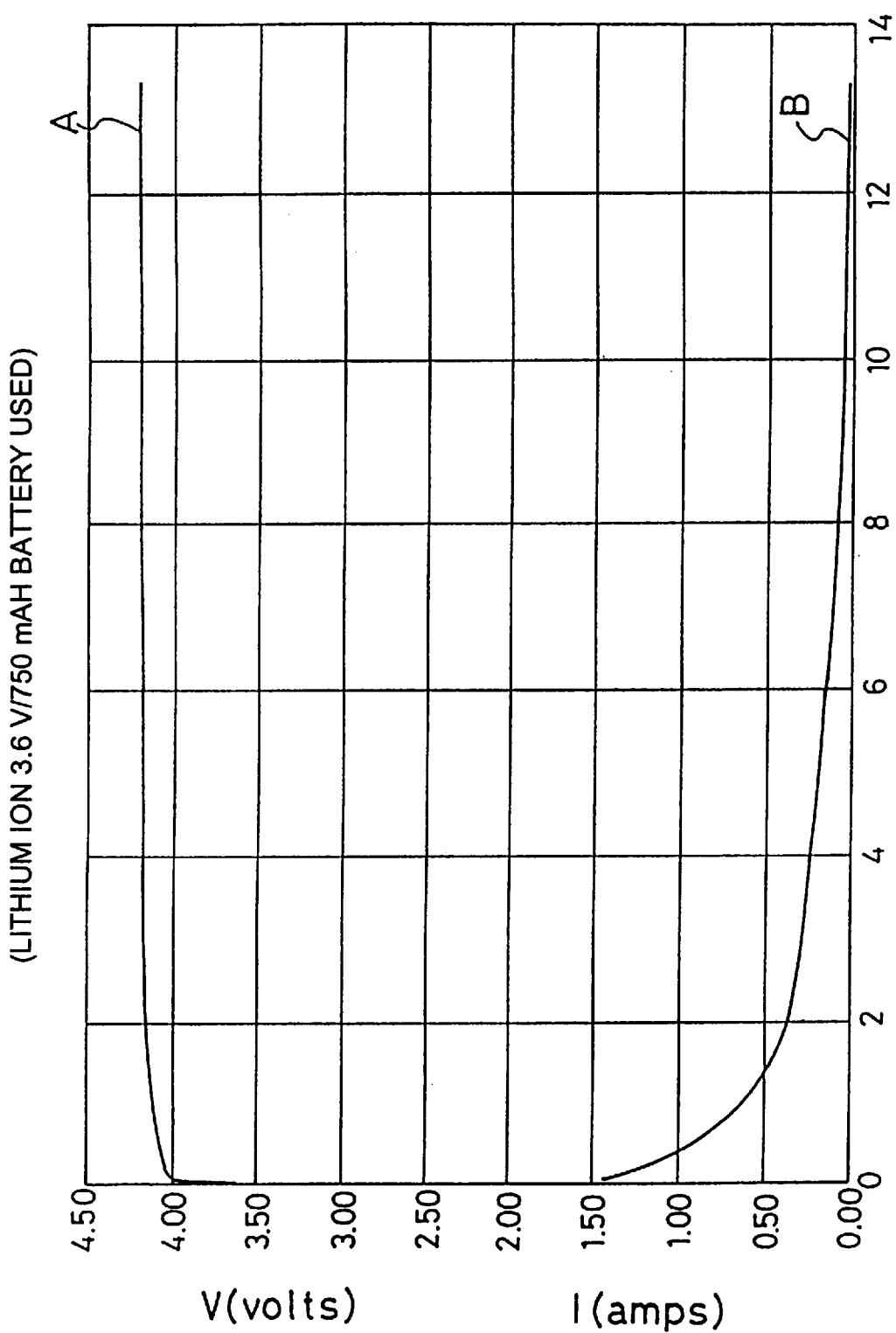
FIG. 15 is a graph which shows the characteristics of a secondary cell that was charged by a secondary cell charging method of the past.

In FIG. 15, curve A shows the output voltage characteristics curve for the case of charging the same lithium ion battery as used in FIG. 14 (3.6 V/750 mA), while curve B shows the charging current characteristics for the case of using the charging operation according to a conventional method.

In the method of the past, while the charging current was set by the charging operation so as to be the same, this is merely a naturally occurring decrease that happens in accordance with a rise in the rate of charge. As a result, the point in time at which the judgment is made that the full-charge condition has been reached in unclear, there being no constant point at which the charging operation should be stopped, so that the charging operation is deliberately stopped at the point at which approximately 13300 seconds have elapsed.

As can be seen from these results, in using the charging method of the past, the charging time is as long as 3.86 hours, this being significantly different from the 1.6 hours as indicated in FIG. 14 for the present invention.

Figure 16:
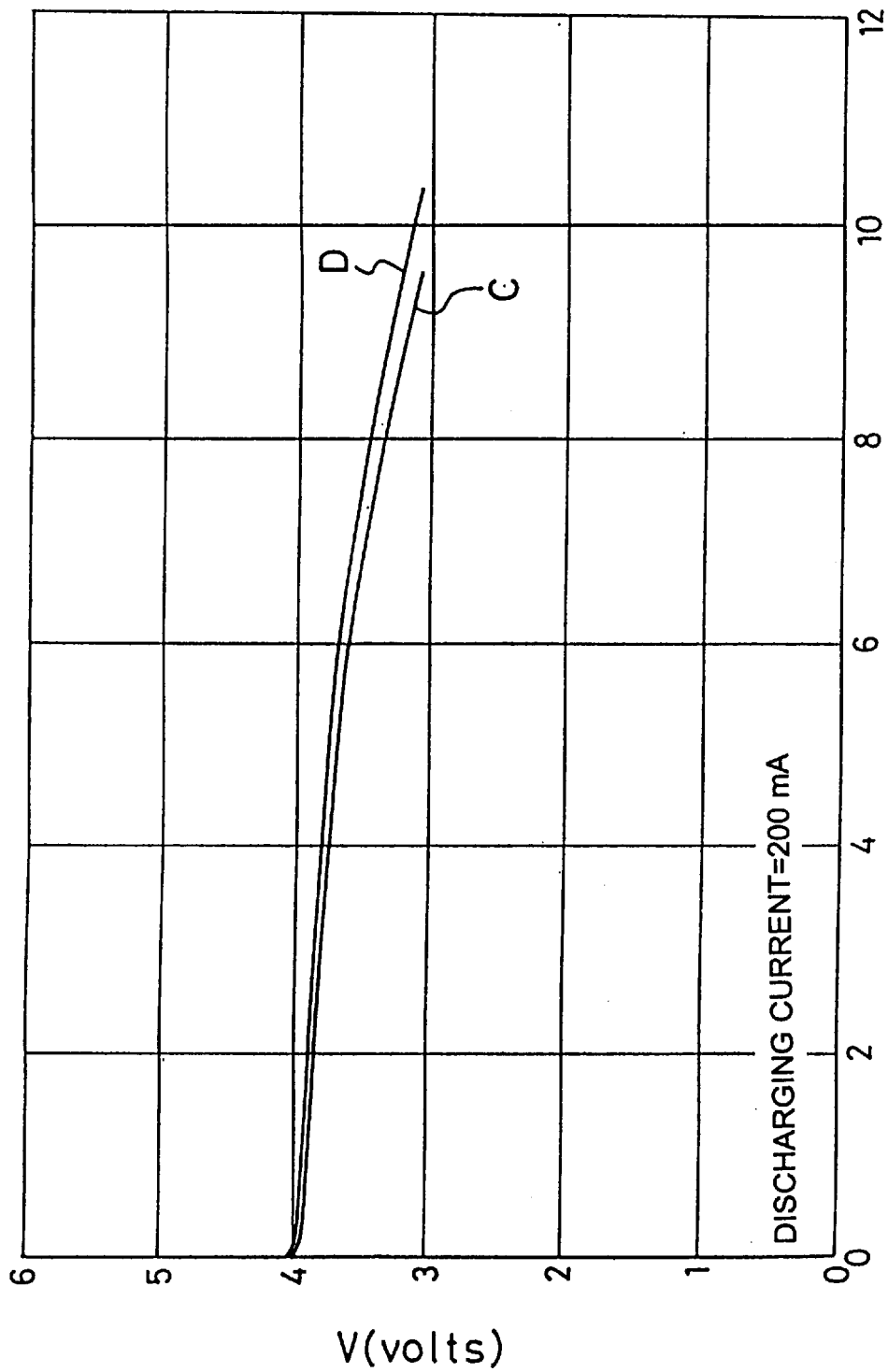
FIG. 16 is a graph which compares the discharging characteristics of a secondary cells charged by the secondary cell charging method of the past and by the charging processing system according to the present invention.

In FIG. 16, curve C indicates the change in the discharge voltage for the case in which a secondary cell, that has been charged by a charging operation according to the present invention, is discharged at a 200-mA discharging current, enabling a comparison with the curve D, which indicates the discharge voltage change under the same conditions of a secondary cell that had been charged according to the conventional method of FIG. 15. It can be seen from this that the secondary cell charged according to the present invention, in spite of the fact that the charging time is shorter than the method of the past, achieves the same full-charge condition as with the method of the past, and achieves also a sufficient capacity.

Within the technical concept noted above, a charging system according to the present invention can be changed in accordance with the type and characteristics of the secondary cell to be charged. Another specific example would be one in which the step-down method shown below is used to enable an 80% change with a charging current of 2 C, a 90% charge with a charging current of 1 C, a 97% charge with a charging current of ½ C, and a 100% charge with a charging current of ¼ C. Thus enabling a 100% charge to be achieved in 45.6 minutes.

|  | C Rate | Charge (%) | Time | Elapsed Time |
|---|---|---|---|---|
| 1st period | 2C | 80 | 24 min. | 24 min. |
| 2nd period | 1C | 90 | 6 min. | 30 min. |
| 3rd period | 1/2C | 97 | 8.4 min. | 38.4 min. |
| 4th period | 1/4C | 100 | 7.2 min. | 45.6 min. |

Using the method of the past, because achievement of a 100% charge was only possible with ¼ C, the amount of time required to achieve a 100% charge was 4 hours. This in contrast to the present invention, which enables the completion of the charging in approximately ⅕ of that time.

In the case in which it is acceptable to charge a secondary cell to 97%, in contrast to the method of the past which required a charging time of 2 hours, the charging system according to the present invention requires 38.4 minutes, which enables completion of charging in approximately ⅓ the time.

In the case in which it is acceptable to charge a secondary cell to 90%, in contrast to the method of the past which required a charging time of 1 hour, the charging system according to the present invention requires 30 minutes, which enables completion of charging in approximately ½ the time.

In addition, when charging a secondary cell a pre-peak as described above occurs, after which a true peak occurs in the charging operation. By using the charging system of the present invention to perform charging, it is possible to charge to almost the true full-charge condition, and if charging is done up until the true peak occurs, the pre-peak disappears, after which no further pre-peaks occur in the charging operation, greatly facilitating subsequent charging operations and enabling achievement of sufficient power.

Namely, when the charging system of the present invention is used, the secondary cells which show a pre-peak and to which insufficient charging operations have been applied, theretofore, can be restored and rejuvenated.

That is, if a secondary cell is a pack-type battery that is formed from a plurality of cells having the same nominal capacity, if each of these cells normally has a different residual capacity, or a different pre-peak value, or a different output voltage characteristics curve, a pseudo-peak will occur for each cell at the peak value for each cell, and the above-noted problem will occur. However, by using the charging system of the present invention, it is possible to adjust the charging characteristics of the plurality of cells making up the pack so as to be the same, so that in subsequent charging operations absolutely no pre-peaks or pseudo-peaks occur, thereby enabling regeneration of the plurality of cells making up the pack by the charger. As a result, in a charging operation of a pack-type battery which is made up of a plurality of cells in combination, it is possible to always maintain the plurality of cells making up the pack at approximately the full-charge condition, thus enabling the achievement of the maximum power from the secondary cell.

The fact that this is made possible means that, when making up a pack-type battery from a plurality of cells in combination, it is not necessary to perform the troublesome tasks of checking the characteristics of each individual cell and combining cells having the same characteristics. This make it possible to combine individual cells without worrying about their individual characteristics because the cell characteristics will be adjusted to one another by the charging apparatus. It is additionally possible in subsequent charging operations to always achieve the full-charge condition, thereby providing a charging method for secondary cell capable of exhibiting the maximum power in a very short period of time, this method representing a revolutionary charging system that is completely different in concept from the method of the past.

In a charging system according to the present invention, it is desirable to set the above-noted M to 2 or greater.

In addition, in the past, it was known that because one cause of the occurrence of a peak in the output voltage before the full-charge condition in a secondary cell made up of a single cell was insufficient activation of an activating substance within the battery, the chemical reaction lagged behind the current, causing a rise in the temperature of the battery and the extremely early occurrence of peak in the increasing battery voltage.

To solve the above-noted problem, one method of activating the above-noted activating substance was that of maintaining the full-charge condition by charging with a small current that would allow the internal chemical reaction track. With this method, however, quite a long period of time is required to reach the full-charge condition, presenting a problem in achieving the object of high-speed charging.

With the present invention, however, charging is first done with a large charging current, which is switched to a smaller current before the battery temperature increases, thus causing activation in a relatively short period of time, without causing deterioration of the battery.

In this case, it is first necessary to make a judgment as to whether or not the secondary cell is an inactivated battery, and to make a judgment as to what will be used as the criterion for switching the charging current, and as to at what time the charging operation will be stopped.

First, with regard to the judgment as to whether or not the secondary cell is inactivated, in general, because a battery immediately after fabrication and a battery that has remained unused for a long period of time is an inactivated battery, its voltage will normally not be greater than 1.2 V.

Therefore, if the output voltage of the secondary cell is less than 1.2 V before the start of charging, it is can be judged to be an inactivated battery.

Next, with regard to how the charging current is to be switched during the charging operation in the charging system, there are basically two types of charging characteristics of an inactivated battery. One in which the battery voltage does not rise and describes a flat characteristics curve, and another in which at quite an early point in time after the start of the charging operation the battery exhibits a peak as if it were a normal battery.

Therefore, bearing these differences in mind, it is possible, for example, if the voltage level exceeds a prescribed value or if a prescribed amount of time has elapsed, to switch the amount of charging current.

If the output voltage characteristics curve is flat, if the battery is continuously charged in this condition, because the temperature of the battery will continue to rise, it is desirable to stop the charging operation and switch the amount of charging current after the elapse of a given period of time.

That is, in the charging of an inactivated battery, it is sufficient to switch the above-noted amount of charging current only once in performing the charging operation.

Specifically, it is sufficient to stop the charging operation at the point at which the second stopping of charging is reached.

In the above-noted example, the amount of charging current used in the second charging operation is made smaller than the amount of charging current used in the first charging operation, but this can also be made a fixed value.

That is, even if the charging current C rate used in the first charging operation is 4 C or is 2 C, the charging current C rate used in the second charging operation can be fixed at, for example, a C rate of 0.25 C.

Next, the operating sequence of a charging system for the purpose of performing charging of the above-noted inactivated secondary cell will be described, with reference being made to the flowchart shown in FIG. 17.

Specifically, after the start, at step (1) the battery voltage of the secondary cell is measured, and at step (2) a judgment is made as to whether or not the voltage for each cell of the secondary cell is 1.2 V or lower. If the result of this judgment is N (no), that is, if the voltage of each cell exceeds 1.2 V, the judgment is made that the battery is activated, and the charging operation is stopped. If, however, the result is Y (yes), because the judgment is made that the possibility that the secondary cell is an inactivated secondary cell is large, processing proceeds to step (3), at which the inactivated flag is set.

Next, processing proceeds to step (4), at which a charging operation of the secondary cell with a prescribed charging current having a C rate of, for example, 4 C or 2 C, is started and, at step (5), if a prescribed condition of the secondary cell is indicated, by a method such as described above, the charging operation is stopped.

Processing proceeds to step (6), at which a test is made to see if the inactivated flag is on. If the result of this test is N (no), the processing ends. If, however, the result of the flag testing is Y (yes), processing proceeds to step (7), at which the amount of elapsed time since the start of the charging is measured and, if this amount of charging time is within, for example, 75% of the time normally required to achieve the full-charge condition, the result of the judgment performed at this step is Y (yes), in which case the secondary cell is judged as being an inactivated secondary cell, causing processing to proceed to step (9), at which time the time for subsequent charging T4 is determined by calculation and set.

If the result of the judgment made at step (7) was N (no), however, processing proceeds to step (8), at which a judgment is made as to whether or not the amount of charge of the secondary cell is at or below a prescribed proportion, for example 60%, of the normal full-charge condition. If it is not (that is, if the result of the judgment is no), the judgment is made that the secondary cell is an inactivated secondary cell and the charging of the secondary cell is stopped. If, however, the result is yes, processing proceeds to step (9) as above, at which the time for a subsequent charging T4 is set.

Figure 18:
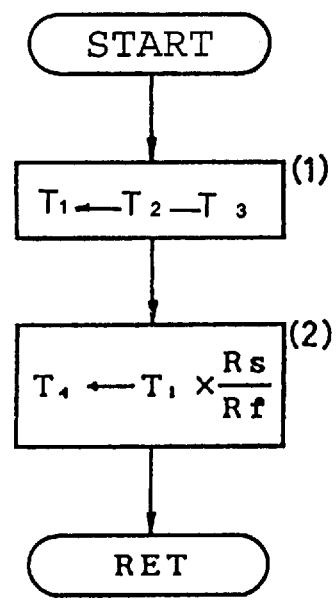
FIG. 18 is a flowchart which illustrates a subroutine in the flowchart of FIG. 17.

FIG. 18 shows a subroutine which determines the time for subsequent charging T4.

After the start, at step (1) the calculation T1<--T2-T3 is performed.

Figure 17:
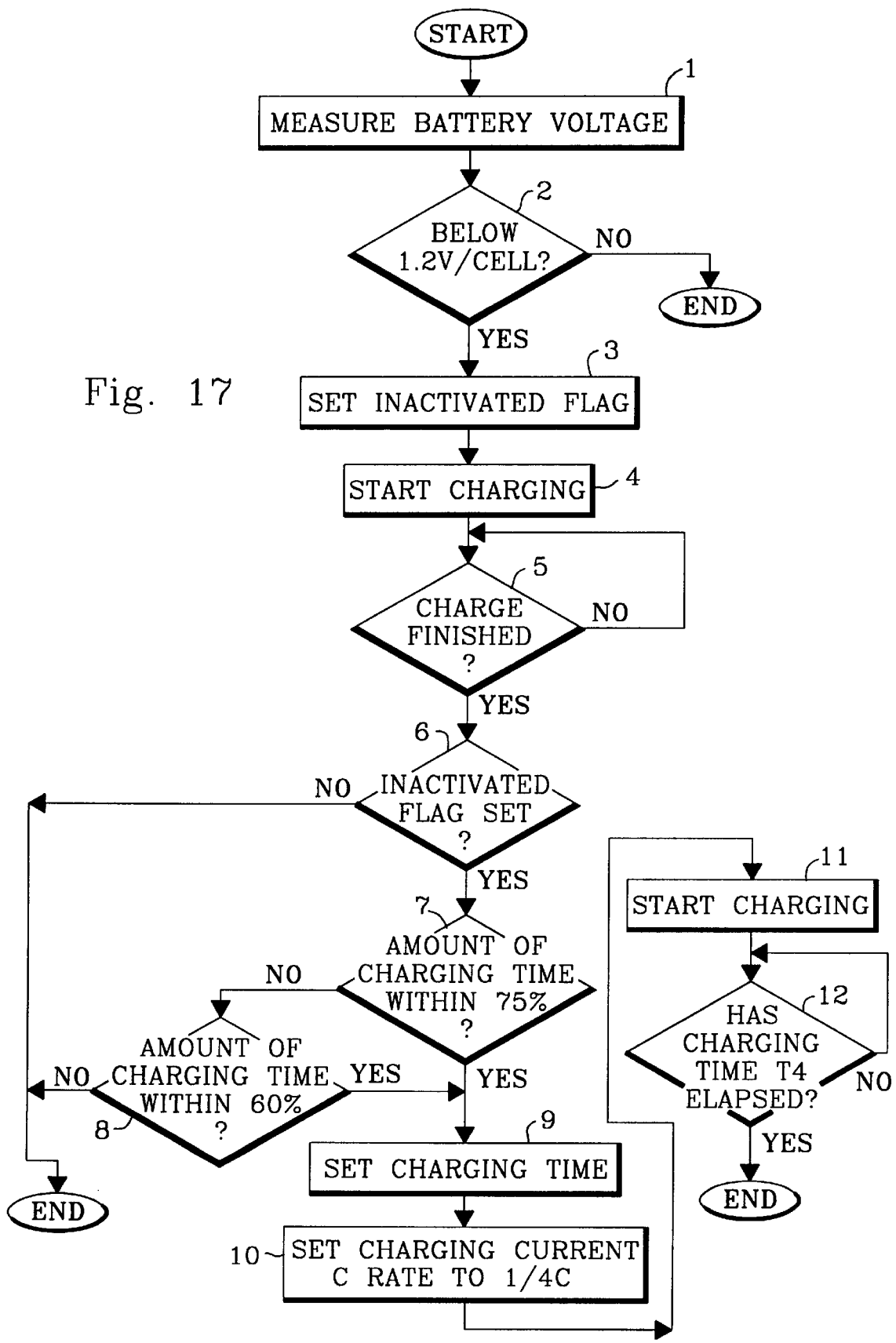
FIG. 17 is a flowchart which illustrates an example of activating an inactivated secondary cell in the charging processing system according to the present invention.

In the above, T2 is the amount of time required to achieve a full-charge condition in the secondary cell which was completely discharged, and T3 is the amount of charging time elapsed in the charging operation, that is, the elapsed time between step (4) and step (5) in FIG. 17.

T1 indicates the amount of charging time required to achieve the remaining amount of charge at the amount of current Rs which was initially set, for example, 4 C or 2 C.

Next, at step (2), the calculation T4<--T1×(Rs/Rf) is performed.

In the above, Rs indicates the amount of charging current for an activation charging and is, for example, 0.25 C (a fixed value).

T4 is the amount of charging time required to achieve the remaining capacity using the newly set charging current amount Rs.

When the subsequent charging time T4 is determined, this subroutine ends, and return is made to step (9) of FIG. 17.

At step (10), the amount of charging current to be actually used is set at the amount of charging current Rs set as described above, and at step (11) the subsequent charging is started.

Next, processing proceeds to step (12), at which a judgment is made as to whether or not the charging time has reached T4. If the result is N (no), the charging operation is continued, and if the result is Y (yes), the charging operation is stopped.

As a concrete example of the above operations, if T3=10 minutes, Rs=4 C, and Rf=¼ C, then T2=15 minutes, and T1=T2−T3=5 minutes.

Therefore, T4=5×4/0.25=80 minutes.

Next, as a description of an example of the method of measuring the amount of charge of the secondary cell at step (8) in the above-noted flowchart, in the method of measuring the amount of charge in the past, the battery voltage during charging was measured, a value corresponding to the measured voltage being determined as the amount of charge of the secondary cell.

However, in charging a secondary cell, the output voltage of the secondary cell generally follows the relationship shown below.

That is, the voltage Vb of a secondary cell during charging is $$Vb = I \times Rint + Vpo1 + Vtr.$$

In the above relationship, I is the charging current, Rint is the internal resistance of the secondary cell, Vpo1 is the overvoltage caused by polarization, and Vtr is the true secondary cell voltage.

That is, the voltage of a secondary cell during charging has an overvoltage generated by polarization and a voltage generated by virtue of the internal resistance of the battery added to the true voltage Vtr, so that taking the battery voltage immediately after measurement as the secondary cell charging amount results in a considerable error in this value, making it difficult to accurately measure the voltage of the secondary cell and accurately measure the amount of charge of the secondary cell.

The above-noted voltage Vpo1 caused by polarization is known to vary greatly, depending up the charging current, the amount of charge, the battery capacity, the battery temperature, the materials used therein, and the like.

Therefore, using a method such as used in the past, the accuracy in calculating the amount of charge by using a value that always includes an overvoltage was considerably bad.

The above-noted overvoltage is known to exhibit the following properties.

(1) The overvoltage is large at low temperatures and small at high temperatures.
(2) The overvoltage is large when the charging current is large.
(3) When the current is cutoff, the overvoltage gradually drops, this drop being more sudden the larger is the overvoltage.
(4) For several tens of seconds after the current is cutoff (for example 60 seconds), the overvoltage is approximately the same for a given amount of charge, regardless of the battery.

Figures 19, 20:
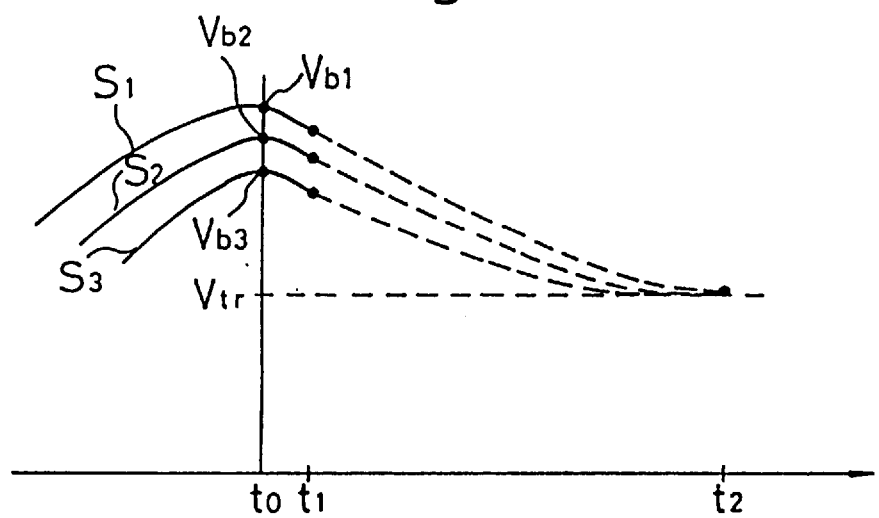
FIG. 19 is a graph which illustrates an example of the method of measuring the amount of charge of a secondary cell in the present invention.
FIG. 20 shows an example of a lookup table which is used in the method of measuring the amount of charge in the present invention.

That is, as shown in FIG. 19, the voltage for even one and the same secondary cell during charging is indicated by an output voltage characteristics curve (S1, S2, and S3) that differs depending upon the condition thereof, and at the time t0 when the charging operation is completed, the various voltages Vb1, Vb2, and Vb3 are indicated.

These voltages Vb1, Vb2, and Vb3 indicate levels that are higher than the above-noted true voltage Vtr of the secondary cell.

However, after a prescribed amount of time, such as 60 seconds, has elapsed, these voltage values Vb1, Vb2, and Vb3 settle so as to approximate the true voltage value of Vtr.

Therefore, if the measurement of the voltage value of the secondary cell is postponed until the time t2, it is possible to obtain an accurate measurement of the voltage of the secondary cell.

However, because this would mean requiring an excessive amount of time for charging, thereby preventing the attainment of the object of high-speed charging, in the present invention the voltage of the secondary cell is measured at the time t0 and at a time t1 which is several seconds, for example 5 seconds, after the time to and the rate in drop of the voltage is calculated, a known statistical method being employed to predict the voltage value at t2, this predicted value being used to calculate the amount of charge of the secondary cell.

For the purpose of performing the calculation of the amount of charge of the secondary cell, a lookup table into which is entered amounts of charge that correspond to the above-noted predicted value of voltage is prepared beforehand, and once the predicted voltage value is obtained, the amount of charge is calculated from this lookup table.

FIG. 20 shows an example of the above-noted lookup table.

While the accurate method of measuring the above-noted secondary cell amount of current is explained for the example of temporarily interrupting the charging operation in the present invention and performing the measurement in the time before the charging operation with the newly set charging current having the new amount of charging, the method of measuring the above-noted secondary cell amount of charging is not limited to that shown in the above-noted example, and can be executed at any point in time during the execution of the charging operation.

That is, in a charging operation that includes the charging operation according to the present invention, when measuring the amount of charge, the charging current is temporarily cutoff at the time of the measurement and the output voltage of the secondary cell is measured at two points, or preferably at three points, the slope therebetween being calculated, and a prediction of the asymptote value being made.

More specifically, during execution of the above-noted charging operation the above-noted measurement and calculation for the prediction of the asymptote value can be repeatedly executed at a pre-established time interval, to improve the accuracy of the prediction of the amount of charge of the secondary cell.

Next, the effect obtained by using a charging system according to the present invention will be described, with reference being made to the data shown in FIG. 21 through FIG. 23.

Figure 21:
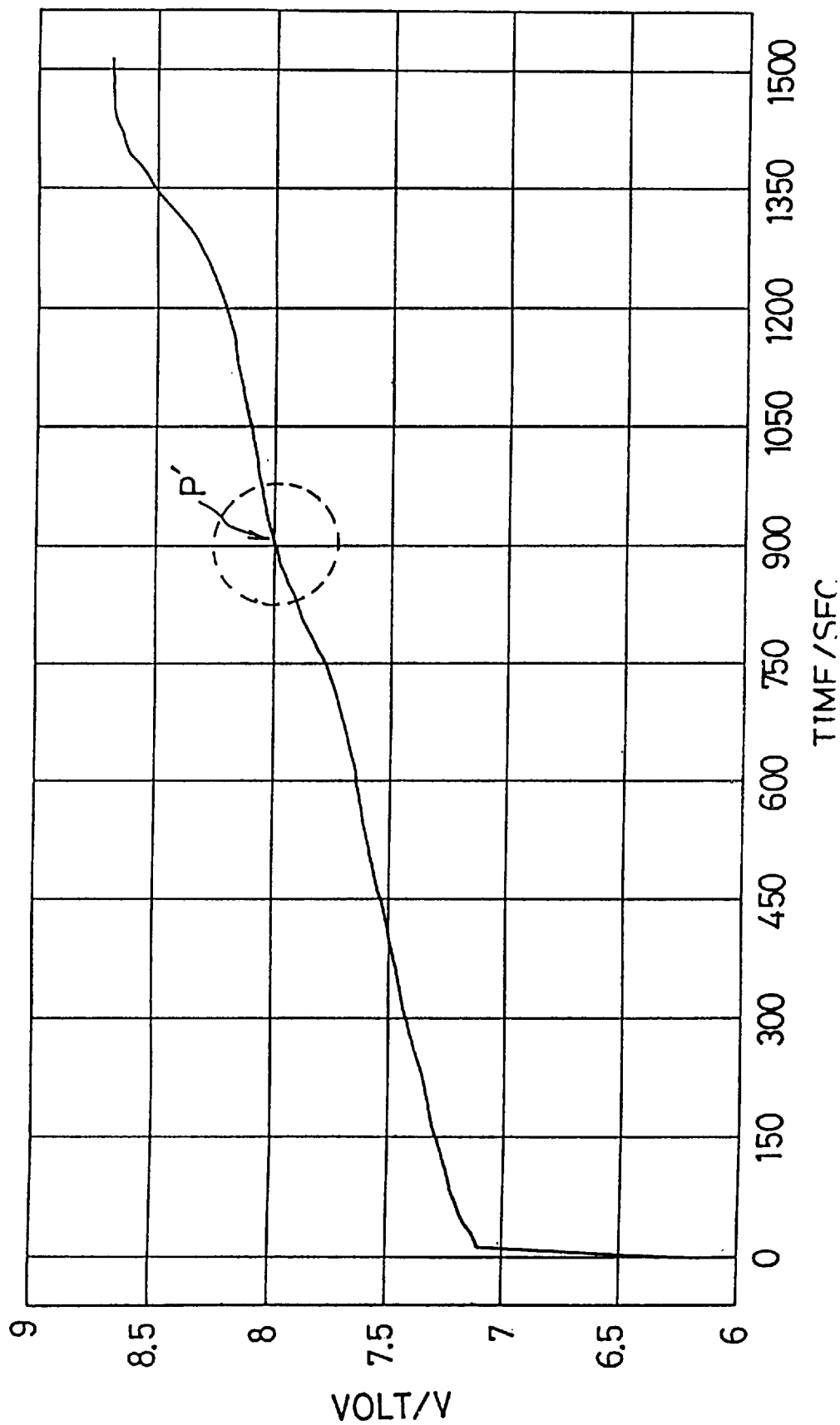
FIG. 21 is a graph which shows the condition in which a pseudo-peak occurs in a secondary cell in the past.

FIG. 21 shows the output voltage characteristics curve obtained in the case in which one cell of a secondary cell formed from five cells has a charge amount that is 20% greater than the other four cells, this showing the pseudo-peak which occurs at the point at which approximately 900 seconds has elapsed from the start to the charging operation.

Figure 22:
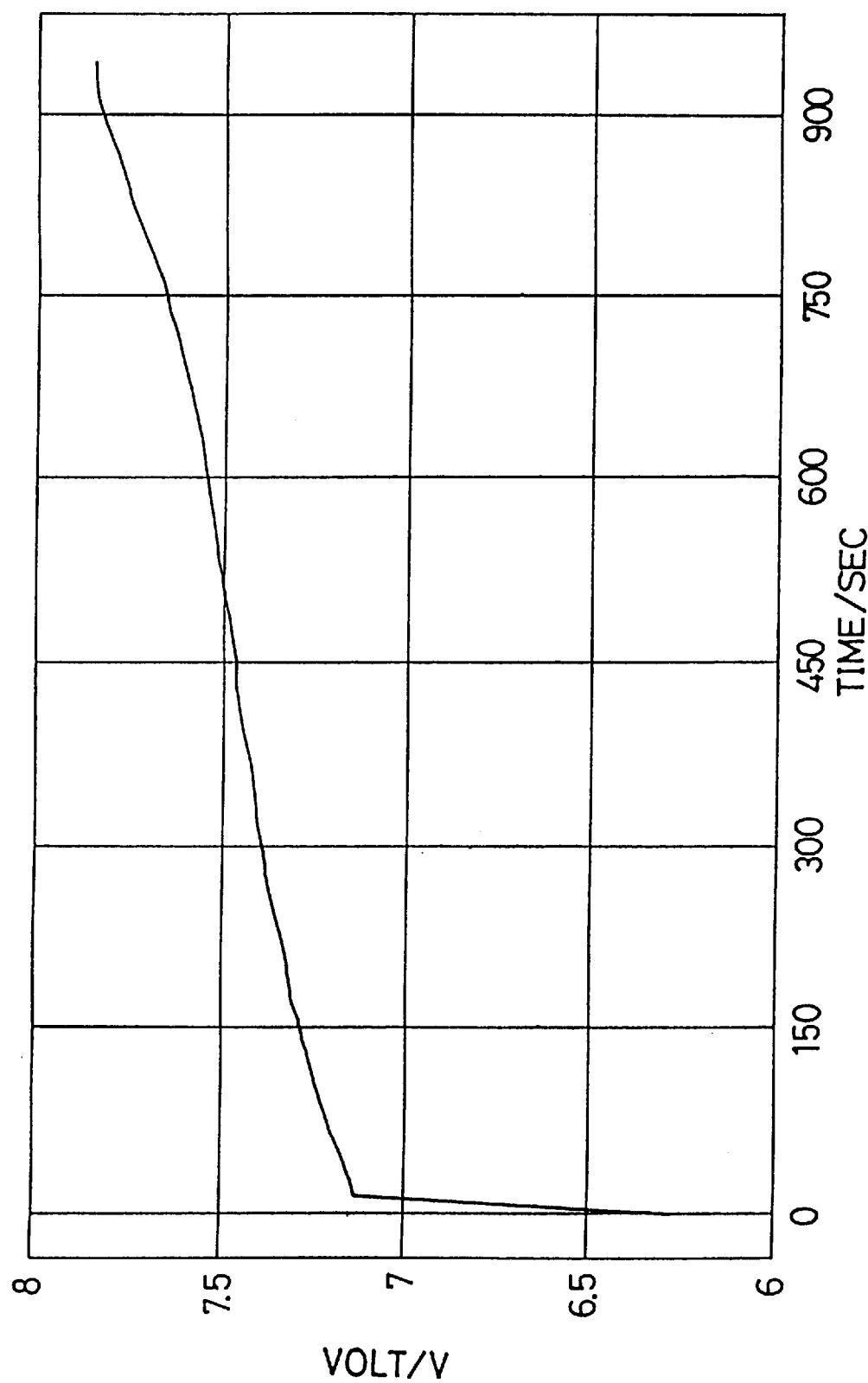
FIG. 22 is a graph which shows the output voltage characteristics curve when the secondary cell of FIG. 21 is charged by the method of the past.

In this secondary cell, as shown in FIG. 22, using a method of the past, the charging stops at the point at which approximately 900 seconds has elapsed from the start of charging, the charging time being very short and hence the amount of charge of the battery being very small.

Figure 23:
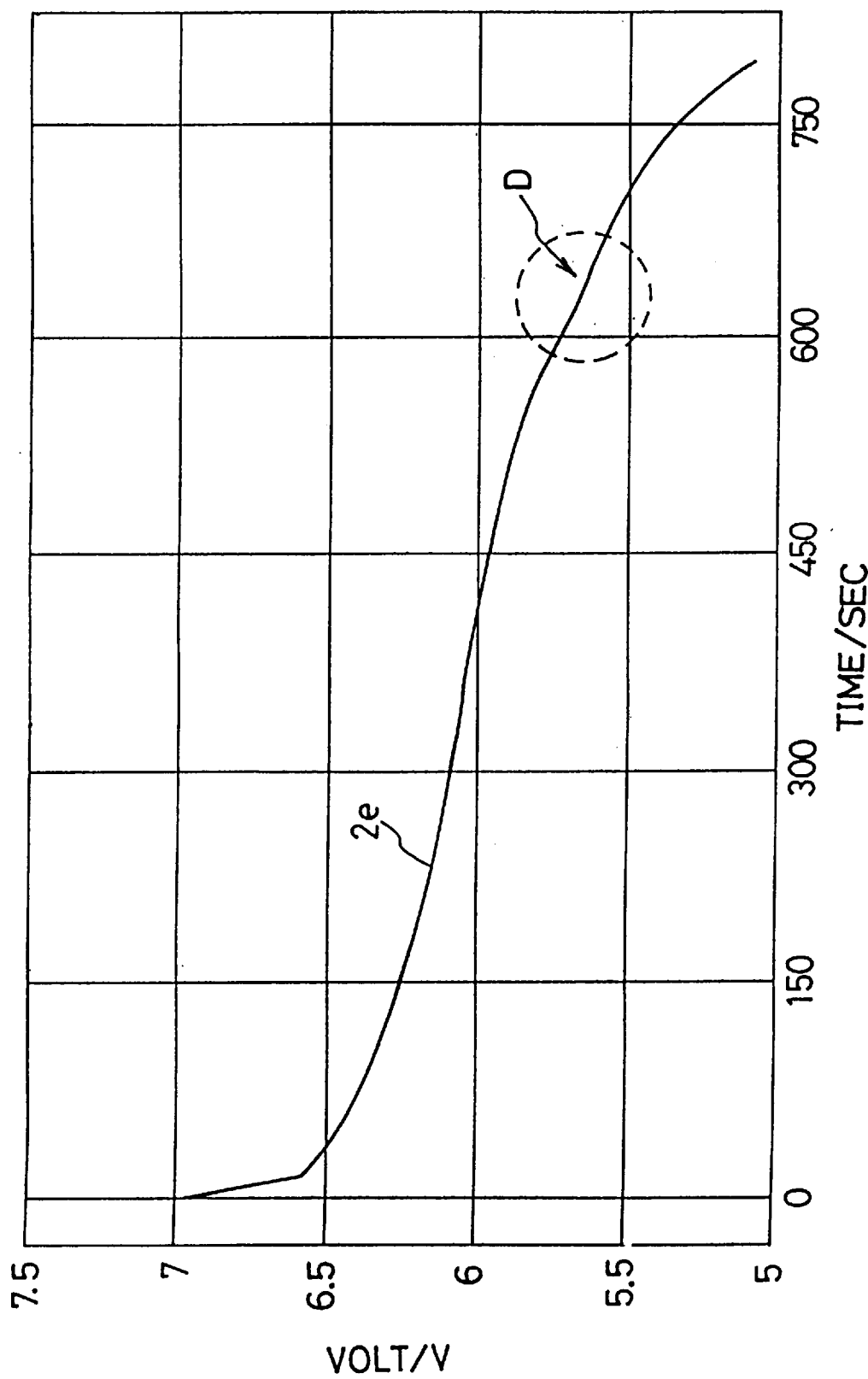
FIG. 23 is a graph which shows the discharging characteristics of a secondary cell obtained as shown in FIG. 22.

Therefore, as shown in FIG. 23, in the case in which this secondary cell is discharged with a 2 C discharging current, the discharging time is a very short time of 750 seconds, demonstrating that the battery is not able to exhibit sufficient power.

Furthermore, in the above-noted charging operation, a stepped part D occurs in the discharging characteristics, indicating that it is not suitable for driving a load.

Figure 24:
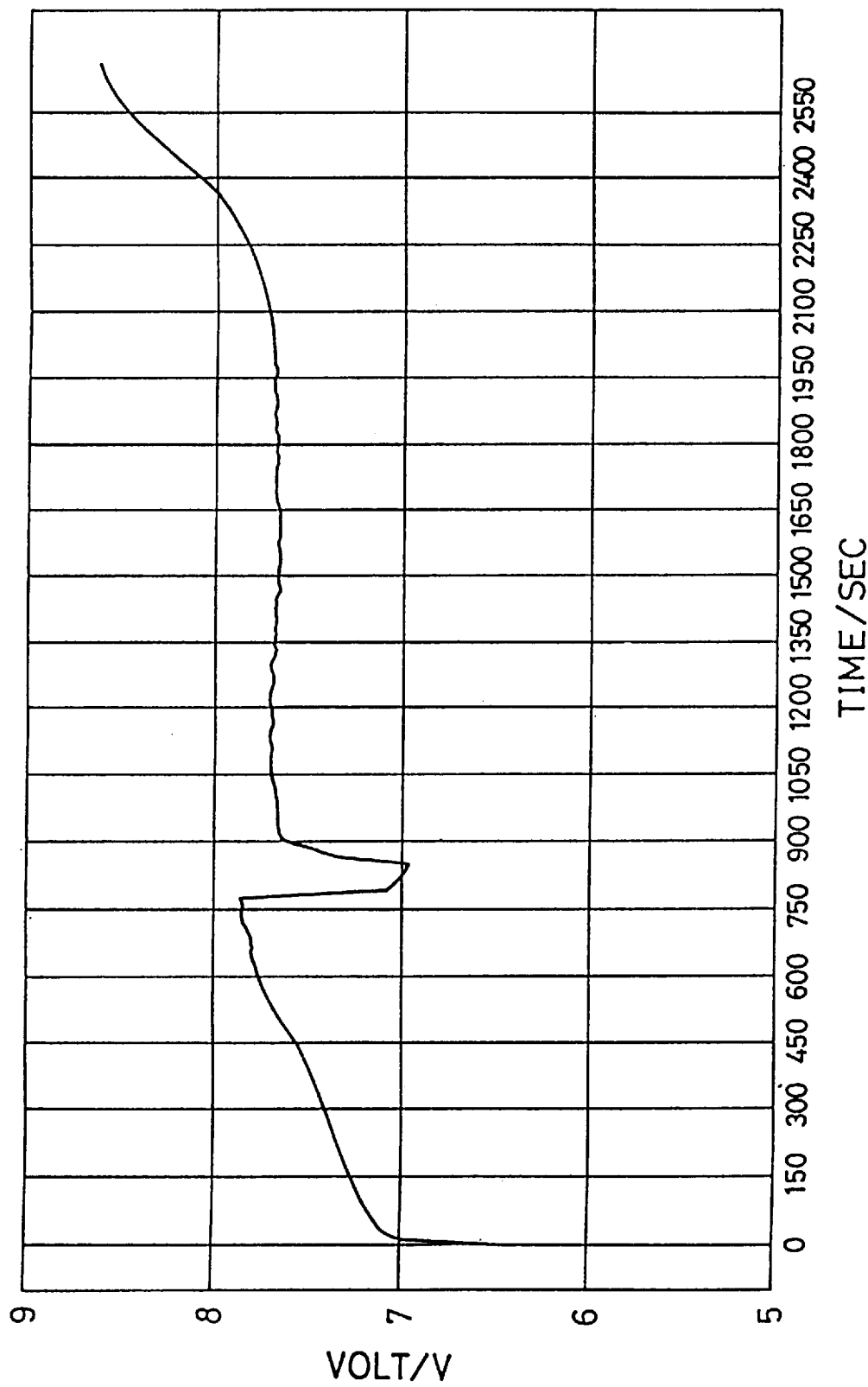
FIG. 24 is a graph which shows the output voltage characteristics curve for the case in which the secondary cell of FIG. 21 is charged by the charging system of the present invention.

Turning to FIG. 24, we see an output voltage characteristics curve for the case of executing a charging operation on the same secondary cell as used in the case of FIG. 21, using a charging system according to the present invention.

In the first charging operation, the charging is performed with a 2 C charging current, and at the point at which approximately 750 seconds have elapsed from the start of the charging, the charging is temporarily interrupted and, after a waiting time of 60 seconds, the next charging operation, using a charging current of 1 C is started, that charging operation being stopped when 2550 seconds have elapsed.

Figure 25:
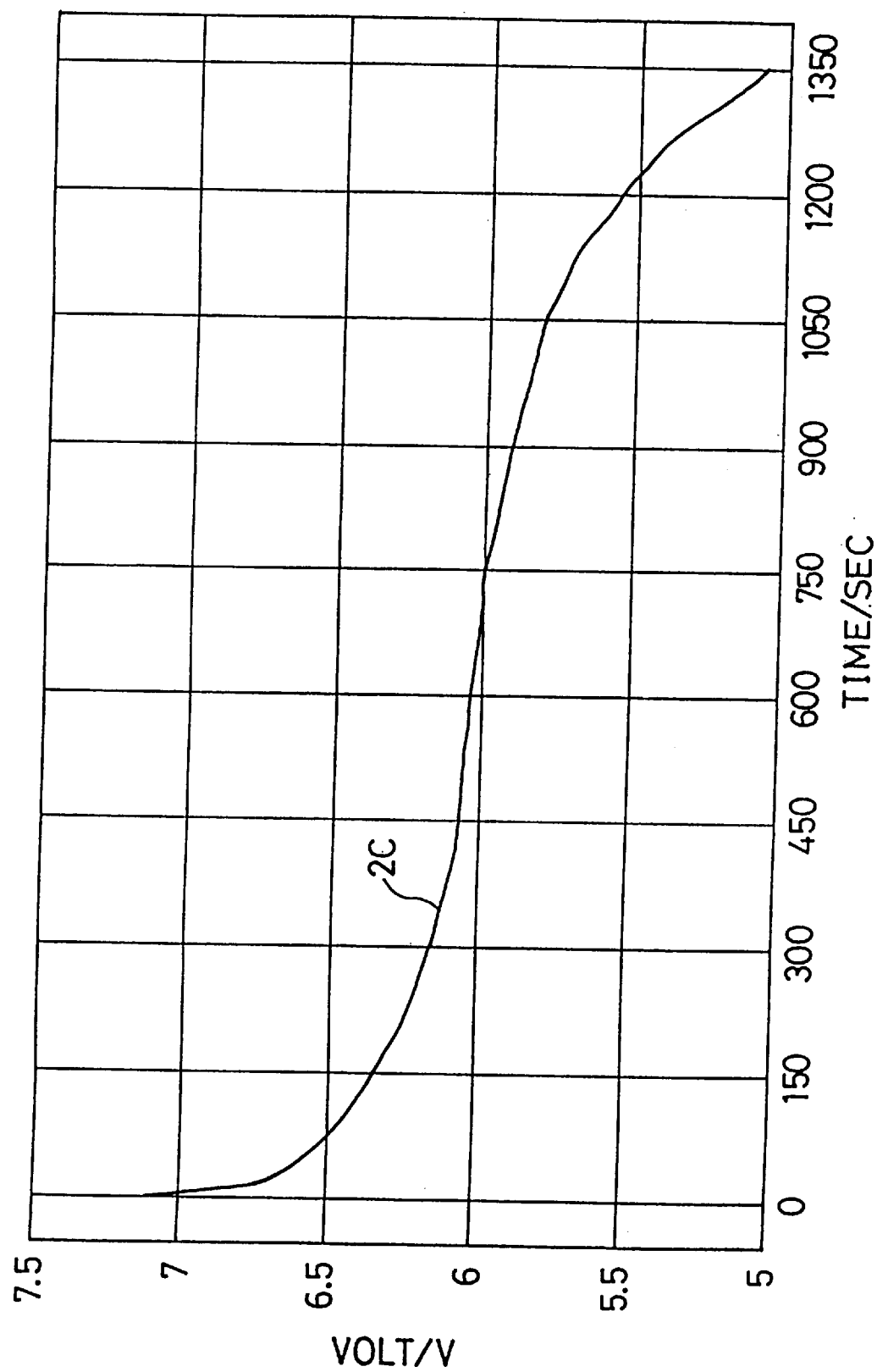
FIG. 25 is a graph which shows the discharging characteristics of a secondary cell processed as shown in FIG. 24.

FIG. 25 is a graph which shows the discharging characteristics of a secondary cell that has been charged as described with regard to FIG. 24, from which it can be seen that the discharging time is a long time of 1350 seconds, and that sufficient power is obtained.

Furthermore, the discharging characteristics do not exhibit the kind of step D as shown in FIG. 23.

Figure 26:
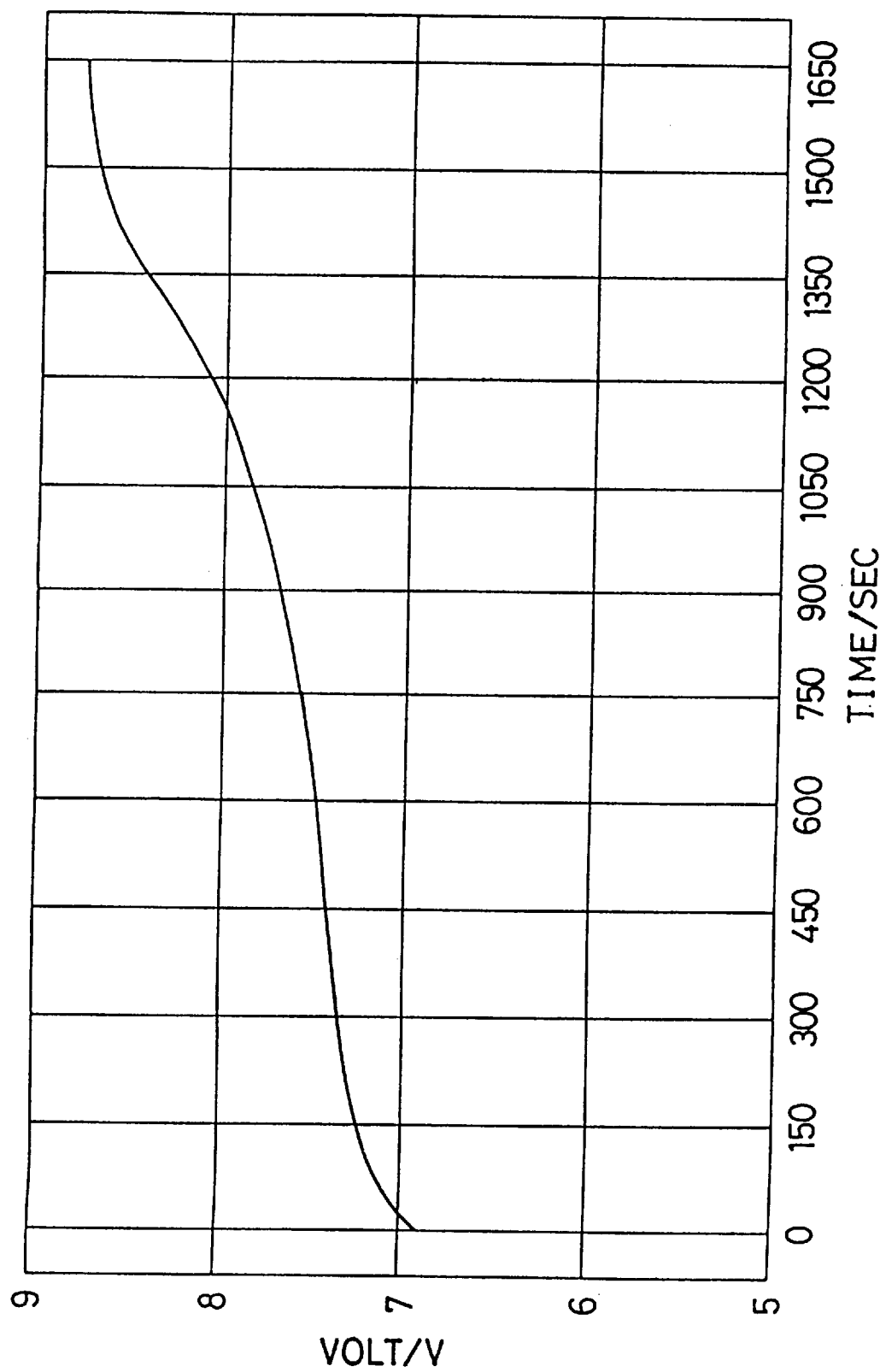
FIG. 26 is a graph which shows the output voltage characteristics curve for the case in which a secondary cell processed as shown in FIG. 24 is recharged by the method of the past.

FIG. 26 shows the output voltage curve obtained in the case of charging a secondary cell that had been charged according to FIG. 24 again by the method of the past. This indicates that there is no pseudo-peak generated as was the case in FIG. 21, and clearly shows that the secondary cell is regenerated and rejuvenated to a highly efficient secondary cell.

Figure 27:
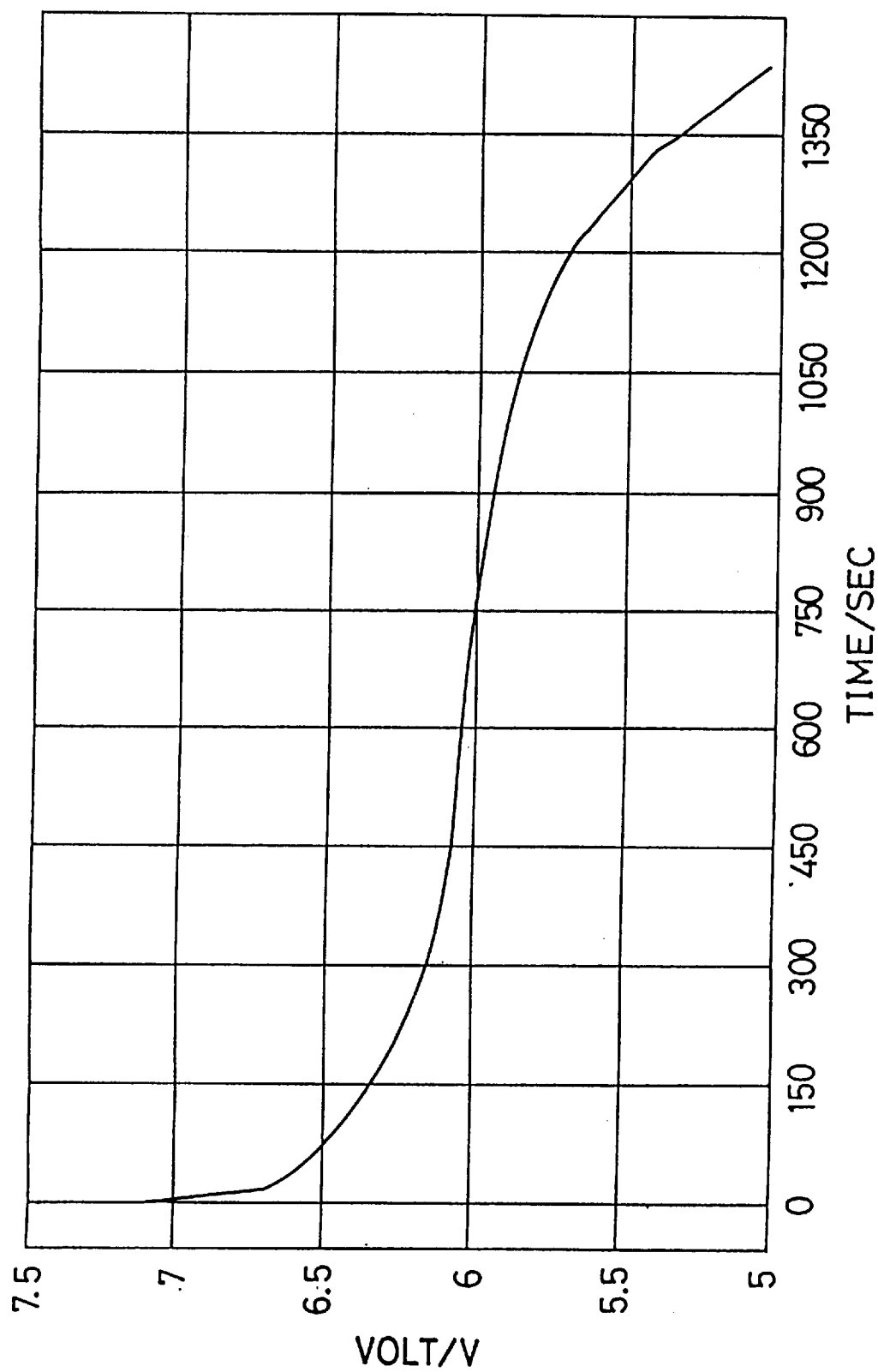
FIG. 27 is a graph which shows the discharge characteristics of a secondary cell that is charged as shown in FIG. 26.

FIG. 27 is a graph which shows the discharge characteristics curve of a secondary cell that was charged as shown in FIG. 26, from which it can be seen that the discharge time characteristic is the same as shown in FIG. 25.

Next, an example of the case in which the same type of charging operation is performed on a secondary cell formed from a single cell.

Figure 34:
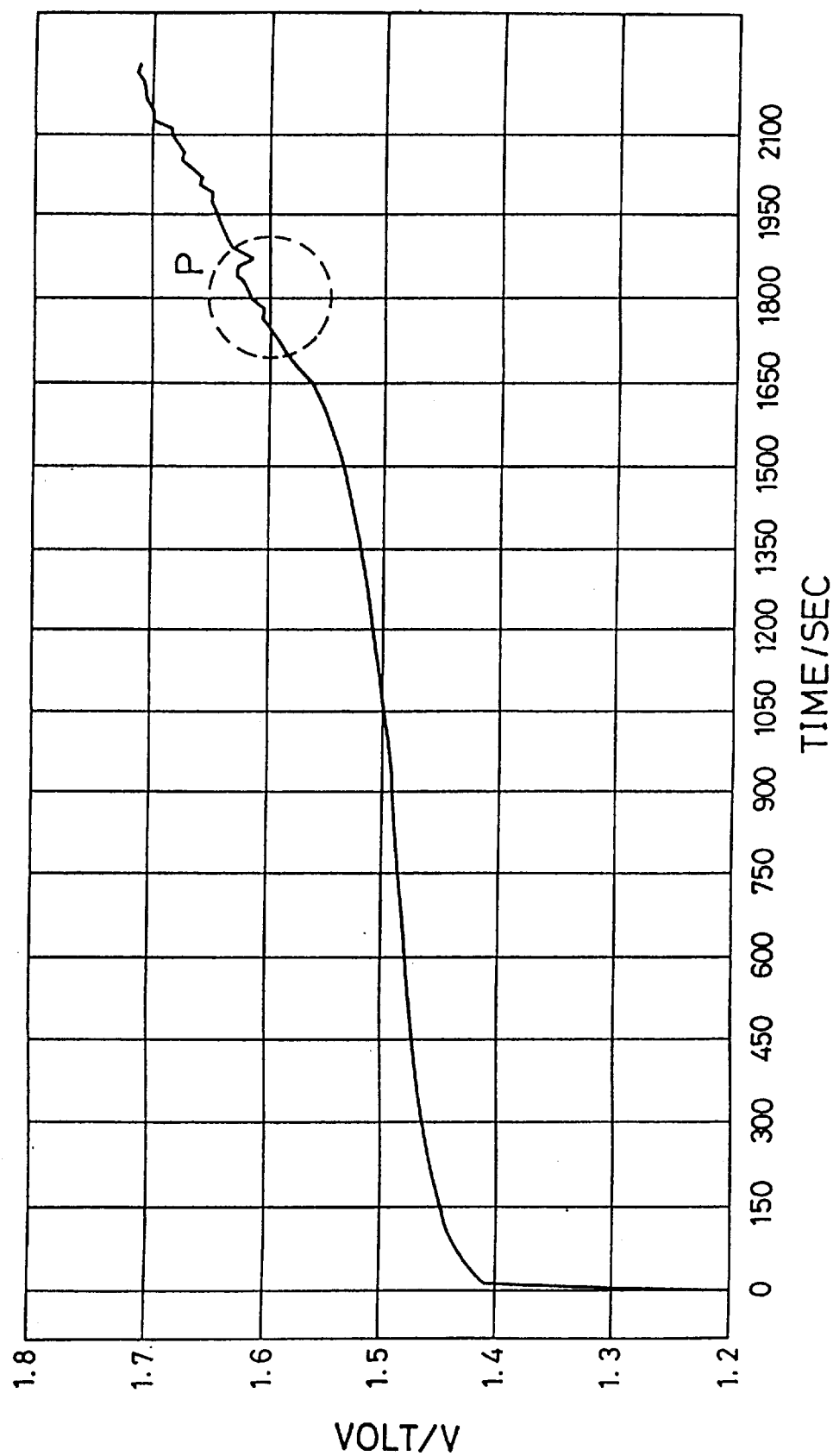
FIG. 34 is a graph which shows the condition in which a pre-peak P occurs in the case in which a secondary cell comprising one cell is charged.

FIG. 34 shows that if charging is done of a secondary cell formed from a single cell, a pre-peak is generated at the point at which approximately 1850 seconds have elapsed from the start of the charging operation.

Figure 28:
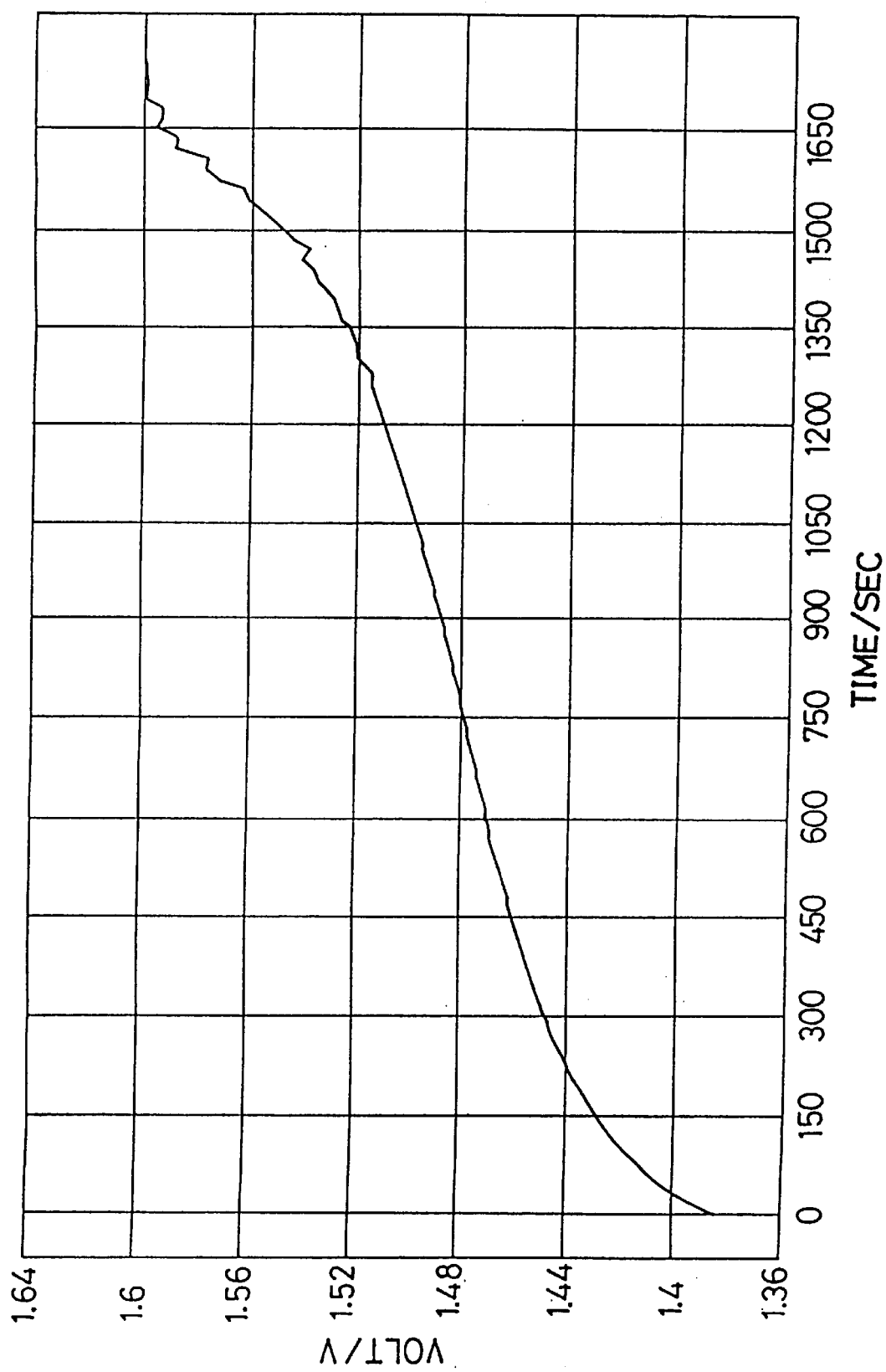
FIG. 28 is a graph which shows the charging process of a secondary cell comprising one cell that is charged by the charging method of the past.

In this secondary cell, as shown in FIG. 28, the charging operation would be stopped when approximately 1750 seconds have elapsed with the charging method of the past, the charging time being extremely short, and the resulting amount of charge of the battery being extremely small.

Figure 29:
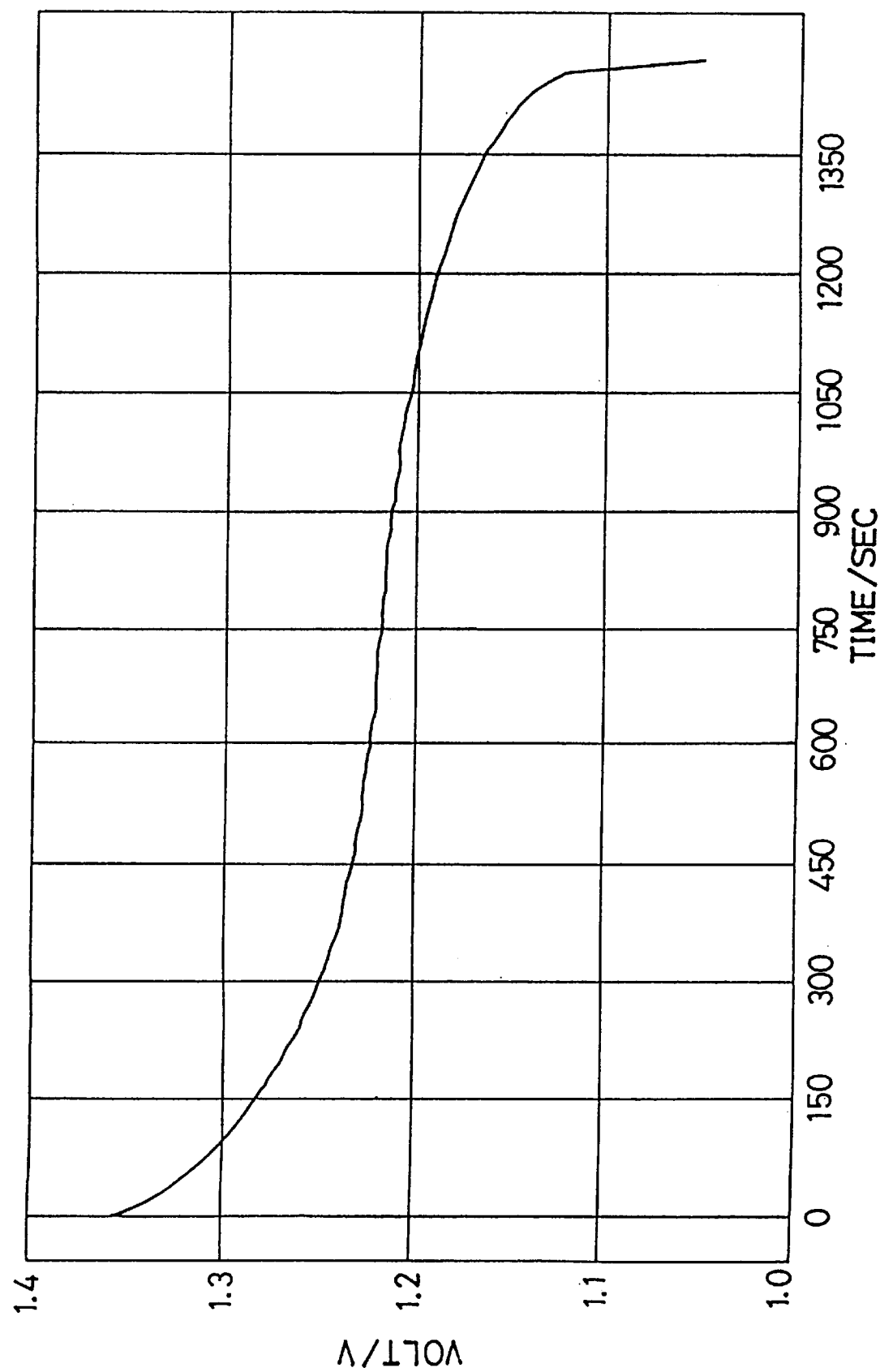
FIG. 29 is a graph which shows the discharging characteristics of a secondary cell obtained by FIG. 28.

In this secondary cell, as shown in FIG. 29, it can be seen that the discharging time is an extremely short time of approximately 1400 seconds, and that the battery is not capable of exhibiting sufficient power.

Figure 30:
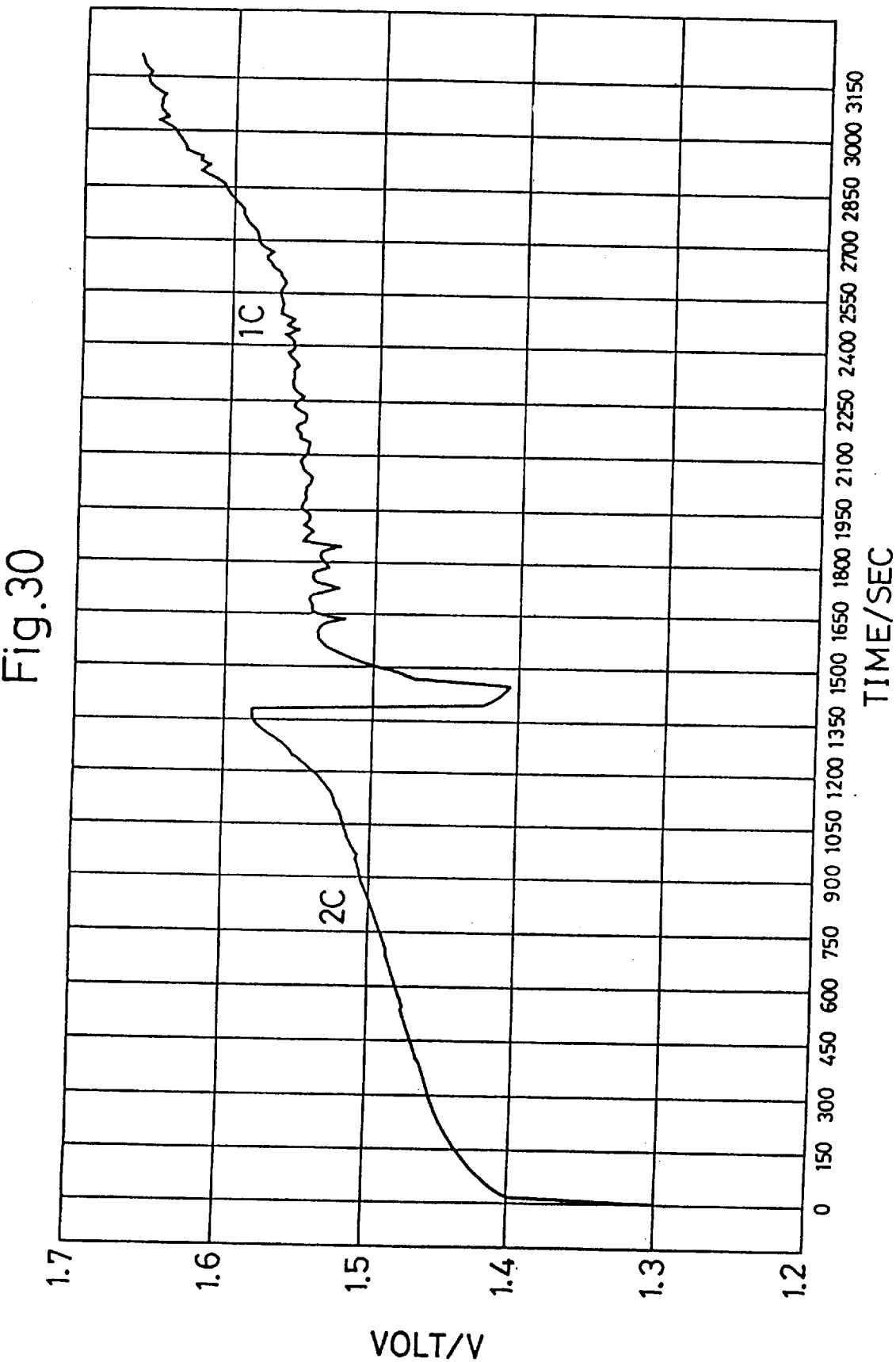
FIG. 30 is a graph which shows the output voltage characteristics curve for the case in which the secondary cell of FIG. 28 is processed by the charging system of the present invention.

FIG. 30 shows the output voltage characteristics curve for the case in which the same cell used in FIG. 28 is charged according to the present invention.

In the first charging operation, the charging is performed with a 2 C charging current, and at the point at which approximately 1400 seconds have elapsed from the start of the charging, the charging is temporarily interrupted and, after a waiting time of 60 seconds, the next charging operation, using a charging current of 1 C is started, that charging operation being stopped when 3150 seconds have elapsed.

Figure 31:
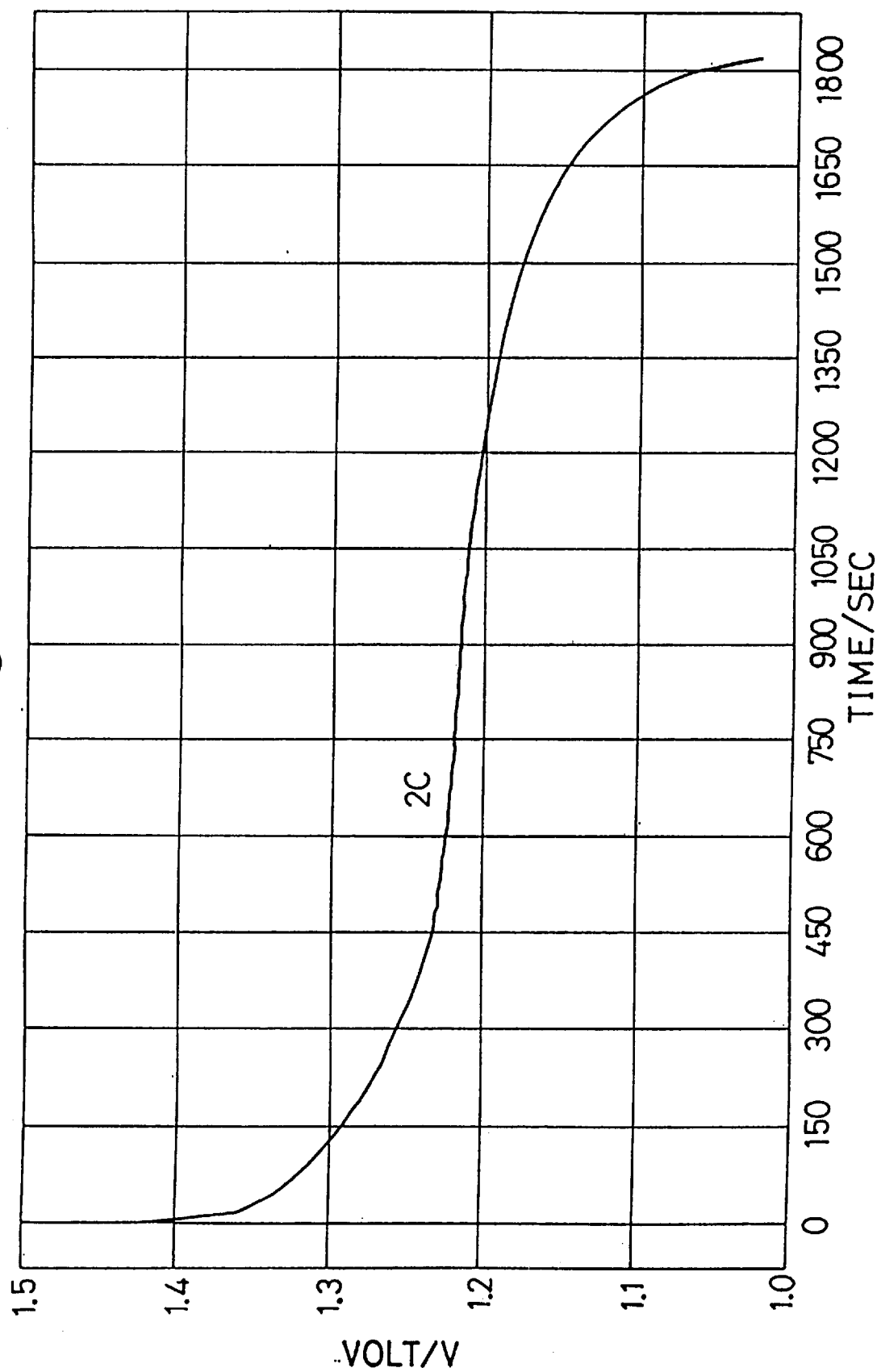
FIG. 31 is a graph which shows the discharging characteristics of a secondary cell obtained by FIG. 30.

FIG. 31 is a graph which shows the discharging characteristics of a secondary cell that has been charged as described with regard to FIG. 30, from which it can be seen that the discharging time is a long time of 1800 seconds, and that sufficient power is obtained.

Figure 32:
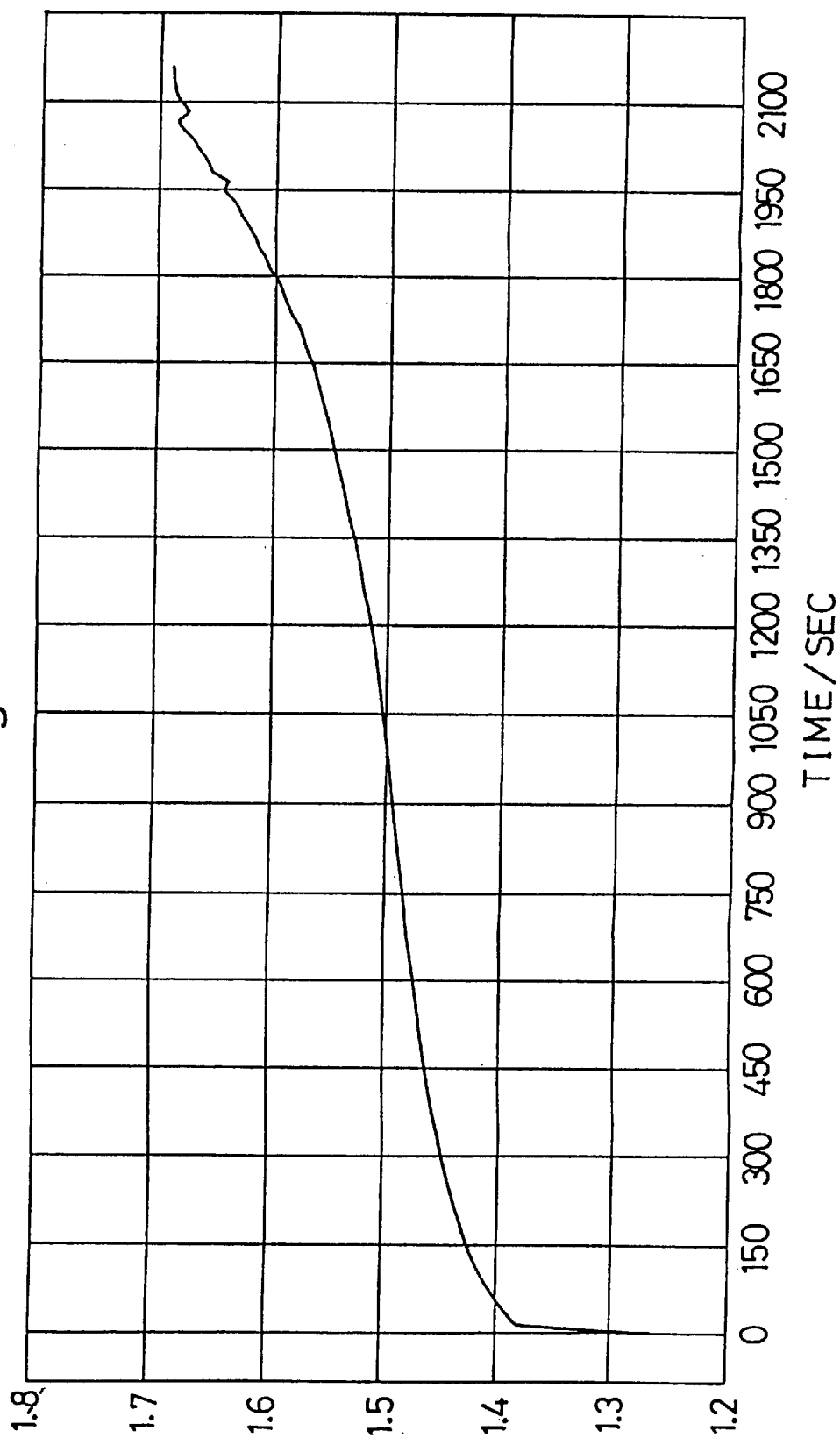
FIG. 32 is a graph which shows the output voltage characteristics curve for the case in which a secondary cell that was charged as shown in FIG. 30 is recharged by the charging method of the past.

FIG. 32 shows the output voltage curve obtained in the case of charging a secondary cell that had been charged according to FIG. 30 again by the method of the past. This indicates that there is no pre-peak generated as was the case in FIG. 28, and clearly shows that the secondary cell is regenerated and rejuvenated to a highly efficient secondary cell.

Figure 33:
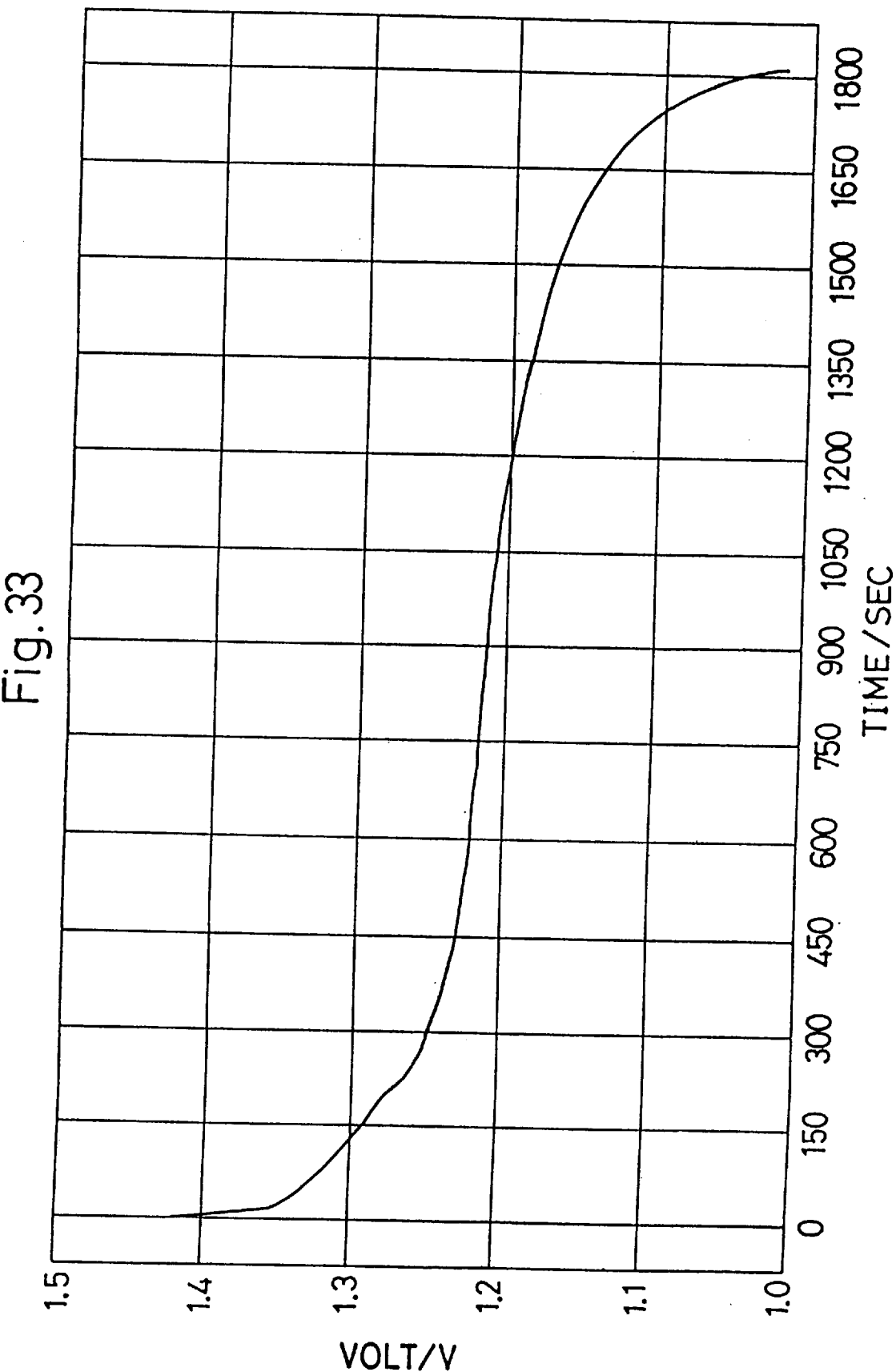
FIG. 33 is a graph which shows the discharging characteristics of a secondary cell obtained as shown in FIG. 32.

FIG. 33 is a graph which shows the discharge characteristics curve of a secondary cell that was charged as shown in FIG. 32, from which it can be seen that the discharge time characteristic is the same as shown in FIG. 31.

By using the charging system and the charging apparatus according to the present invention, in the case of a secondary cell which is made from a single cell, and even in the case of a secondary cell which is formed from a plurality of cells in combination, a high-speed charging system and high-speed charging apparatus are provided in which in the charging operation the timing of the achievement of the full-charge condition of the secondary cell is detected accurately and which is always capable of charging a secondary cell to the full-charge condition.

Additionally, a charging system and charging apparatus are provided which can rejuvenate a secondary cell having an improper output voltage characteristics curve because of its history to a secondary cell having a proper output voltage characteristics curve, and which, even for a secondary cell comprising a plurality of cells having mutually differing output voltage characteristics curves, can regenerate the secondary cell so that each cell has approximately the same output voltage characteristics curve.

What is claimed is:

1. A charging system in which a charging characteristic of a secondary cell is detected while charging said secondary cell, comprising executing of charging of said secondary cell by using a current of a first prescribed amount, and wherein in the case in which a pre-established condition with regard to said secondary cell is detected, subsequent charging of the secondary cell using a second prescribed amount of current which is smaller than said first prescribed amount of current, after which when said pre-established condition with regard to said secondary cell is detected, charging of the secondary cell is performed yet again, using a third prescribed amount of current which is smaller than said second prescribed amount of current, charging operations being repeated until said secondary cell achieves a condition in which the charging is substantially completed, and further wherein a waiting time period is inserted between each of said operations.

2. A charging system in which a charging characteristic of a secondary cell is detected while charging said secondary cell, comprising:

a first time period, during which said secondary cell is charged using a first prescribed amount of current;

a second time period, during which, in the case of detection of a pre-established condition in said secondary cell during the first time period, said secondary cell is charged again with a second prescribed amount of current that is smaller than said first prescribed amount of current;

a third time period during which, in the case of detection of a pre-established condition in the secondary cell during the second time period, the secondary cell is charged again with a third prescribed amount of current that is yet smaller than said second prescribed amount of current; and a fourth time period, during which the operation of the above-noted third time period is repeated with a prescribed amount of current that is smaller than said previous prescribed amount of current, until the charging of said secondary cell is completed;

wherein a waiting time period is inserted between each of said first through fourth time periods.

3. A charging system according to either claim 1 or claim 2, wherein said secondary cell which is formed either from a single cell or from a plurality of cells in combination.

4. A charging system in which a charging characteristic of a secondary cell is detected while charging said secondary cell, comprising executing of charging of said secondary cell by using a prescribed amount of current, in said charging system there is included:

a first step which temporarily interrupts said charging operation in the case in which a pre-established condition with regard to said secondary cell is detected, and a second step which, when subsequently charging said secondary cell using a current that has a value that is smaller than said pre-established value, stops said charging operation in the case in which the above-noted pre-established condition with regard to said secondary cell is detected, this second step being repeated as necessary, and when the total number of said stopping of charging operations, including stopping of charging operations in said first step and said second step reaches a pre-established number of times (M), said secondary cell is treated as having substantially reached the full-charge condition, and said charging operation is stopped.

5. A charging system according to claim 4, wherein said total number of stopping of charging operations (M) is an integer which is greater than 1.

6. A charging system in which a charging characteristic of a secondary cell is detected while charging said secondary cell, comprising executing of charging of said secondary cell by using a prescribed amount of current, in said charging step there is included:

a first step which temporarily interrupts said charging operation in the case in which a pre-established condition with regard to said secondary cell is detected, and a second step which, when subsequently charging said secondary cell using a current that has a value that is smaller than said pre-established value, stops said charging operation in the case in which the above-noted pre-established condition with regard to said secondary cell is detected, this second step being repeated as necessary, and when the amount of charging current falls below a pre-established amount of current, said secondary cell is treated as having substantially reached the full-charge condition, and said charging operation is stopped.

7. A charging system according to any one of claims 1, 2, 4, 5, or 6, in which a secondary cell is charged by using a current of a prescribed amount, said charging system having a step whereby when a pre-established condition with regard to said secondary cell is detected, said charging is temporarily interrupted, and said secondary cell is then charged with an amount of current that is smaller than the previous prescribed amount of current, said step being repeated, the amount of time from the start of said charging by using said prescribed amount of current until said charging is stopped being measured, and if a prescribed amount of time elapsed before said charging operation is stopped, said charging operation is stopped at that point in time.

8. A secondary cell charging apparatus comprising:

a charging terminal for charging a secondary cell;

a charging characteristic detection means which detects a charging characteristic of said secondary cell;

a current-adjusting means which is connected to said charging terminal and also connected to a prescribed current source; and a control means which is connected to both said detection means and said current-adjusting means, and which, in response to a signal output from said detection means indicating a pre-established condition with regard to said secondary cell, performs control of said current-adjusting means so as to either stop the current supplied to said charging terminal, or to change the amount of current supplied to said charging terminal, said control means having a function which, when changing the amount of charging current supplied to said charging terminal in response to a charging characteristic detection signal from said detection means, sets a value of the amount of charging current to a prescribed value that is smaller than the amount of charging current used the previous time when charging and repeats said control function upon receiving an indication from said detection means that said same pre-established condition has again been detected.

9. A secondary cell charging apparatus according to claim 8, wherein said control means further comprises a clock means and a timer means.

10. A secondary cell charging apparatus according to either claim 8 claim 9, wherein said charging characteristic detection means includes a means for detecting at least one item selected from the group of secondary cell output voltage, secondary cell surface temperature, and charging current.

11. A secondary cell charging apparatus according to claim 9, wherein said timer means inserts a waiting time period between the time at which the charging operation using a prescribed amount of charging current is stopped and a time that a charging operation using an amount of charging current that is smaller than said prescribed amount of charging current is started.

12. A secondary cell charging apparatus according to claim 9, wherein said timer means controls the elapsed time after the start of a charging operation using a prescribed amount of charging current.

13. A secondary cell charging apparatus according to any one of claims 8, 9, 11, or 12, wherein said prescribed current source comprises a plurality of separate power supplies.

14. A secondary cell charging apparatus according to claim 8, wherein said prescribed current source comprises a programmable power supply.

15. A secondary cell charging apparatus according to any one of claim 8, 9, 11, 12 or 14, wherein said current source comprises a single fixed power supply which, by means of pulse current duty cycle control, controls the amount of charging current.

16. A charging system according to claim 3, wherein in the case in which said secondary cell comprises a plurality of cells in combination, each of said plurality of cells has the same nominal capacity and at least one of said plurality of cells has a residual capacity and discharging characteristics that differ from the other cells of said plurality of cells.

17. A secondary cell activation system which, in charging a secondary cell while detecting a charging characteristic of said secondary cell, comprises:

a step which measures an output voltage of said secondary cell;

a step which, in the case in which the battery voltage of said secondary cell is below a prescribed voltage, sets an inactivated flag, and then starts charging with a prescribed amount of current;

a step which, in the case in which a prescribed condition regarding said secondary cell is detected, stops said charging operation;

a step which, after said charging operation is stopped, makes a judgment as to whether or not said inactivated flag is set, and which if said inactivated flag is set, makes a judgment as to whether or not a prescribed proportion of the amount of charging time required has elapsed;

a step which, in the case in which more than said prescribed proportion of the amount of charging time required has elapsed, makes a judgment as to whether or not the amount of charge of said secondary cell is below a prescribed amount of charge;

a step which, in the case in which either said prescribed proportion of the amount of charging time required has not elapsed or the amount of charge of said secondary cell is below a prescribed amount of charge, sets a prescribed amount of added charging time;

a step which sets the amount of charging current to be used in said added charging time period to a prescribed value of charging current that is smaller than the amount of charging current that had been used in said charging operation and which starts charging said secondary cell; and a step which, when said amount of added charging time has elapsed, stops said charging operation.

18. An amount of charge measurement system for a secondary cell being charged while a charging characteristic is detected, in which when measuring the battery voltage of said secondary cell and determining the amount of charging thereof, charging of said secondary cell is performed using a prescribed amount of charging current, the supply of said charging current being stopped each prescribed interval of time, at which point in time the battery voltage of said secondary cell is measured and an asymptote value of the battery voltage thereof is predicted, the amount of charge of said secondary cell being determined based on said predicted battery voltage asymptote value.

19. A secondary cell charging apparatus comprising:

a charging terminal for charging a secondary cell;

a charging characteristic detection means which detects a charging characteristic of said secondary cell;

a current-adjusting means which is connected to said charging terminal and also connected to a prescribed current source;

a control means which is connected to both said detection means and said current-adjusting means, and which, in response to a signal output from said detection means indicating a pre-established condition with regard to said secondary cell, performs control of said current-adjusting means so as to either stop the current supplied to said charging terminal, or to change the amount of current supplied to said charging terminal, said control means having a function which, when changing the amount of charging current supplied to said charging terminal in response to a charging characteristic detection signal from said detection means, sets a value of the amount of charging current to a prescribed value that is smaller than the amount of charging current used the previous time when charging; and a clock means and a timer means, wherein said timer means inserts a waiting time period between the time at which the charging operation using a prescribed amount of charging current is stopped and a time that a charging operation using an amount of charging current that is smaller than said prescribed amount of charging current is started.

20. A secondary cell charging apparatus comprising:

a charging terminal for charging a secondary cell;

a charging characteristic detection means which detects a charging characteristic of said secondary cell;

a current-adjusting means which is connected to said charging terminal and also connected to a prescribed current source, wherein said prescribed current source comprises a plurality of separate power supplies; and a control means which is connected to both said detection means and said current-adjusting means, and which, in response to a signal output from said detection means indicating a pre-established condition with regard to said secondary cell, performs control of said current-adjusting means so as to either stop the current supplied to said charging terminal, or to change the amount of current supplied to said charging terminal, said control means having a function which, when changing the amount of charging current supplied to said charging terminal in response to a charging characteristic detection signal from said detection means, sets a value of the amount of charging current to a prescribed value that is smaller than the amount of charging current used the previous time when charging.

* * * * *